(12) United States Patent  (10) Patent No.: US 9,207,800 B1
Eriksson et al.  (45) Date of Patent: Dec. 8, 2015

(54) INTEGRATED LIGHT GUIDE AND TOUCH SCREEN FRAME AND MULTI-TOUCH DETERMINATION METHOD

(71) Applicant: Neonode Inc., Santa Clara, CA (US)

(72) Inventors: Thomas Eriksson, Stockholm (SE); Alexander Jubner, Stockholm (SE); John Karlsson, Märsta (SE); Lars Sparf, Vällingby (SE); Saska Lindfors, Espoo (FI); Robert Pettersson, Huddinge (SE)

(73) Assignee: Neonode Inc., San Jose, CA (US)

( * ) Notice: Subject to any disclaimer, the term of this patent is extended or adjusted under 35 U.S.C. 154(b) by 0 days.

(21) Appl. No.: 14/588,462

(22) Filed: Jan. 2, 2015

Related U.S. Application Data

(60) Provisional application No. 62/054,353, filed on Sep. 23, 2014.

(51) Int. Cl.
    *G06F 3/042* (2006.01)
    *G06F 3/041* (2006.01)

(52) U.S. Cl.
    CPC .............. *G06F 3/0412* (2013.01); *G06F 3/042* (2013.01); *G09G 2300/04* (2013.01)

(58) Field of Classification Search
    None
    See application file for complete search history.

(56) References Cited

U.S. PATENT DOCUMENTS

| | | |
|---|---|---|
| 4,243,879 A | 1/1981 | Carroll et al. |
| 4,267,443 A | 5/1981 | Carroll et al. |
| 4,301,447 A | 11/1981 | Funk et al. |
| 4,588,258 A | 5/1986 | Hoopman |
| 4,641,426 A | 2/1987 | Hartman et al. |
| 4,672,364 A | 6/1987 | Lucas |
| 4,703,316 A | 10/1987 | Sherbeck |

(Continued)

FOREIGN PATENT DOCUMENTS

| | | |
|---|---|---|
| EP | 0601651 A1 | 6/1994 |
| EP | 1 906 632 A2 | 4/2008 |

(Continued)

OTHER PUBLICATIONS

Moeller et al., ZeroTouch: An Optical Multi-Touch and Free-Air Interaction Architecture, Proc. CHI 2012 Proceedings of the 2012 Annual Conference Extended Abstracts on Human Factors in Computing Systems, pp. 2165-2174, ACM, New York, NY, May 5, 2012.

(Continued)

*Primary Examiner* — Adam R Giesy
(74) *Attorney, Agent, or Firm* — Soquel Group LLC

(57) ABSTRACT

A touch screen assembly including a glass screen, LEDs, photo diodes, a transparent plastic frame surrounding the screen, and a light guide that guides light emitted by the LEDs to the photo diodes along light paths that go under the frame on one side, over the screen, and under the frame on the opposite side, and a processor operative to selectively activate LEDs and photo diodes, to identify location of an object touching the screen, based on amounts of light detected by activated photo diodes when light emitted by activated LEDs is blocked along its light path by the object, and to recognize the object touching the frame, based on amounts of light detected by activated photo diodes when light emitted by activated LEDs is absorbed along its light path by the object, thereby providing light-based touch sensitivity to the screen and to the frame.

11 Claims, 34 Drawing Sheets

FALSE POSITIVE

PARALLAX EFFECT

PARALLAX EFFECT

(56) References Cited

U.S. PATENT DOCUMENTS

| | | |
|---|---|---|
| 4,761,637 A | 8/1988 | Lucas et al. |
| 4,928,094 A | 5/1990 | Smith |
| 5,036,187 A | 7/1991 | Yoshida et al. |
| 5,162,783 A | 11/1992 | Moreno |
| 5,194,863 A | 3/1993 | Barker et al. |
| 5,220,409 A | 6/1993 | Bures |
| 5,414,413 A | 5/1995 | Tamaru et al. |
| 5,559,727 A | 9/1996 | Deley et al. |
| 5,577,733 A | 11/1996 | Downing |
| 5,603,053 A | 2/1997 | Gough et al. |
| 5,729,250 A | 3/1998 | Bishop et al. |
| 5,748,185 A | 5/1998 | Stephan et al. |
| 5,825,352 A | 10/1998 | Bisset et al. |
| 5,889,236 A | 3/1999 | Gillespie et al. |
| 5,914,709 A | 6/1999 | Graham et al. |
| 5,936,615 A | 8/1999 | Waters |
| 5,943,044 A | 8/1999 | Martinelli et al. |
| 5,946,134 A | 8/1999 | Benson et al. |
| 5,988,645 A | 11/1999 | Downing |
| 6,010,061 A | 1/2000 | Howell |
| 6,091,405 A | 7/2000 | Lowe et al. |
| 6,333,735 B1 | 12/2001 | Anvekar |
| 6,340,979 B1 | 1/2002 | Beaton et al. |
| 6,362,468 B1 | 3/2002 | Murakami et al. |
| 6,421,042 B1 | 7/2002 | Omura et al. |
| 6,429,857 B1 | 8/2002 | Masters et al. |
| 6,690,365 B2 | 2/2004 | Hinckley et al. |
| 6,690,387 B2 | 2/2004 | Zimmerman et al. |
| 6,707,449 B2 | 3/2004 | Hinckley et al. |
| 6,757,002 B1 | 6/2004 | Oross et al. |
| 6,762,077 B2 | 7/2004 | Schuurmans et al. |
| 6,788,292 B1 | 9/2004 | Nako et al. |
| 6,803,906 B1 | 10/2004 | Morrison et al. |
| 6,836,367 B2 | 12/2004 | Seino et al. |
| 6,864,882 B2 | 3/2005 | Newton |
| 6,947,032 B2 | 9/2005 | Morrison et al. |
| 6,954,197 B2 | 10/2005 | Morrison et al. |
| 6,972,401 B2 | 12/2005 | Akitt et al. |
| 6,972,834 B1 | 12/2005 | Oka et al. |
| 7,030,861 B1 | 4/2006 | Westerman et al. |
| 7,133,032 B2 | 11/2006 | Cok |
| 7,170,590 B2 | 1/2007 | Kishida |
| 7,176,905 B2 | 2/2007 | Baharav et al. |
| 7,184,030 B2 | 2/2007 | McCharles et al. |
| 7,339,580 B2 | 3/2008 | Westerman et al. |
| 7,352,940 B2 | 4/2008 | Charters et al. |
| 7,369,724 B2 | 5/2008 | Deane |
| 7,372,456 B2 | 5/2008 | McLintock |
| 7,429,706 B2 | 9/2008 | Ho |
| 7,855,716 B2 | 12/2010 | McCreary et al. |
| 8,022,941 B2 | 9/2011 | Smoot |
| 8,120,625 B2 | 2/2012 | Hinckley |
| 8,139,045 B2 | 3/2012 | Jang et al. |
| 8,243,047 B2 | 8/2012 | Chiang et al. |
| 8,269,740 B2 | 9/2012 | Sohn et al. |
| 8,350,831 B2 | 1/2013 | Drumm |
| 8,426,799 B2 | 4/2013 | Drumm |
| 8,482,547 B2 | 7/2013 | Christiansson et al. |
| 8,508,505 B2 | 8/2013 | Shin et al. |
| 8,581,884 B2 | 11/2013 | Fahraeus et al. |
| 8,933,876 B2 | 1/2015 | Galor et al. |
| 2001/0002694 A1 | 6/2001 | Nakazawa et al. |
| 2001/0022579 A1 | 9/2001 | Hirabayashi |
| 2001/0026268 A1 | 10/2001 | Ito |
| 2001/0028344 A1 | 10/2001 | Iwamoto et al. |
| 2001/0055006 A1 | 12/2001 | Sano et al. |
| 2002/0067348 A1 | 6/2002 | Masters et al. |
| 2002/0109843 A1 | 8/2002 | Ehsani et al. |
| 2002/0175900 A1 | 11/2002 | Armstrong |
| 2003/0231308 A1 | 12/2003 | Granger |
| 2003/0234346 A1 | 12/2003 | Kao |
| 2004/0046960 A1 | 3/2004 | Wagner et al. |
| 2004/0140961 A1 | 7/2004 | Cok |
| 2004/0201579 A1 | 10/2004 | Graham |
| 2005/0073508 A1 | 4/2005 | Pittel et al. |
| 2005/0104860 A1 | 5/2005 | McCreary et al. |
| 2005/0122308 A1 | 6/2005 | Bell et al. |
| 2005/0174473 A1 | 8/2005 | Morgan et al. |
| 2005/0271319 A1 | 12/2005 | Graham |
| 2006/0001654 A1 | 1/2006 | Smits |
| 2006/0018586 A1 | 1/2006 | Kishida |
| 2006/0132454 A1 | 6/2006 | Chen et al. |
| 2006/0161870 A1 | 7/2006 | Hotelling et al. |
| 2006/0161871 A1 | 7/2006 | Hotelling et al. |
| 2006/0229509 A1 | 10/2006 | Al-Ali et al. |
| 2007/0024598 A1 | 2/2007 | Miller et al. |
| 2007/0052693 A1 | 3/2007 | Watari |
| 2007/0084989 A1 | 4/2007 | Lange et al. |
| 2007/0146318 A1 | 6/2007 | Juh et al. |
| 2007/0152984 A1 | 7/2007 | Ording et al. |
| 2007/0176908 A1 | 8/2007 | Lipman et al. |
| 2008/0008472 A1 | 1/2008 | Dress et al. |
| 2008/0012850 A1 | 1/2008 | Keating, III |
| 2008/0013913 A1 | 1/2008 | Lieberman et al. |
| 2008/0055273 A1 | 3/2008 | Forstall |
| 2008/0056068 A1 | 3/2008 | Yeh et al. |
| 2008/0068353 A1 | 3/2008 | Lieberman et al. |
| 2008/0080811 A1 | 4/2008 | Deane |
| 2008/0093542 A1 | 4/2008 | Lieberman et al. |
| 2008/0100593 A1 | 5/2008 | Skillman et al. |
| 2008/0117183 A1 | 5/2008 | Yu et al. |
| 2008/0122792 A1 | 5/2008 | Izadi et al. |
| 2008/0122796 A1 | 5/2008 | Jobs et al. |
| 2008/0122803 A1 | 5/2008 | Izadi et al. |
| 2008/0158174 A1 | 7/2008 | Land et al. |
| 2008/0221711 A1 | 9/2008 | Trainer |
| 2008/0259053 A1 | 10/2008 | Newton |
| 2008/0273019 A1 | 11/2008 | Deane |
| 2008/0278460 A1 | 11/2008 | Arnett et al. |
| 2008/0297487 A1 | 12/2008 | Hotelling et al. |
| 2009/0009944 A1 | 1/2009 | Yukawa et al. |
| 2009/0027357 A1 | 1/2009 | Morrison |
| 2009/0058833 A1 | 3/2009 | Newton |
| 2009/0066673 A1 | 3/2009 | Molne et al. |
| 2009/0096994 A1 | 4/2009 | Smits |
| 2009/0102815 A1 | 4/2009 | Juni |
| 2009/0135162 A1 | 5/2009 | Van De Wijdeven et al. |
| 2009/0139778 A1 | 6/2009 | Butler et al. |
| 2009/0153519 A1 | 6/2009 | Suarez Rovere |
| 2009/0167724 A1 | 7/2009 | Xuan et al. |
| 2010/0002291 A1 | 1/2010 | Fukuyama |
| 2010/0023895 A1* | 1/2010 | Benko et al. .................. 715/863 |
| 2010/0079407 A1 | 4/2010 | Suggs |
| 2010/0079409 A1 | 4/2010 | Sirotich et al. |
| 2010/0079412 A1 | 4/2010 | Chiang et al. |
| 2010/0095234 A1 | 4/2010 | Lane et al. |
| 2010/0149073 A1 | 6/2010 | Chaum et al. |
| 2010/0289755 A1 | 11/2010 | Zhu et al. |
| 2010/0295821 A1 | 11/2010 | Chang et al. |
| 2010/0302185 A1 | 12/2010 | Han et al. |
| 2011/0043826 A1 | 2/2011 | Kiyose |
| 2011/0044579 A1 | 2/2011 | Travis et al. |
| 2011/0050639 A1 | 3/2011 | Challener et al. |
| 2011/0050650 A1 | 3/2011 | McGibney et al. |
| 2011/0057906 A1 | 3/2011 | Raynor et al. |
| 2011/0063214 A1 | 3/2011 | Knapp |
| 2011/0074734 A1 | 3/2011 | Wassvik et al. |
| 2011/0074736 A1 | 3/2011 | Takakura |
| 2011/0075418 A1 | 3/2011 | Mallory et al. |
| 2011/0090176 A1 | 4/2011 | Christiansson et al. |
| 2011/0116104 A1 | 5/2011 | Kao et al. |
| 2011/0148820 A1* | 6/2011 | Song ............................ 345/175 |
| 2011/0157097 A1 | 6/2011 | Hamada et al. |
| 2011/0163956 A1 | 7/2011 | Zdralek |
| 2011/0163996 A1 | 7/2011 | Wassvik et al. |
| 2011/0169780 A1 | 7/2011 | Goertz et al. |
| 2011/0175533 A1 | 7/2011 | Holman et al. |
| 2011/0175852 A1 | 7/2011 | Goertz et al. |
| 2011/0179368 A1 | 7/2011 | King et al. |
| 2011/0205175 A1 | 8/2011 | Chen |
| 2011/0205186 A1 | 8/2011 | Newton et al. |
| 2011/0221706 A1 | 9/2011 | McGibney et al. |
| 2011/0227487 A1 | 9/2011 | Nichol et al. |
| 2011/0227874 A1 | 9/2011 | Fahraeus et al. |

(56) References Cited

U.S. PATENT DOCUMENTS

| | | |
|---|---|---|
| 2011/0242056 A1 | 10/2011 | Lee et al. |
| 2011/0248151 A1 | 10/2011 | Holcombe et al. |
| 2012/0050226 A1 | 3/2012 | Kato |
| 2012/0056821 A1 | 3/2012 | Goh |
| 2012/0068971 A1 | 3/2012 | Pemberton-Pigott |
| 2012/0068973 A1 | 3/2012 | Christiansson et al. |
| 2012/0086672 A1 | 4/2012 | Tseng et al. |
| 2012/0098753 A1 | 4/2012 | Lu |
| 2012/0098794 A1 | 4/2012 | Kleinert et al. |
| 2012/0176343 A1 | 7/2012 | Holmgren et al. |
| 2012/0188203 A1 | 7/2012 | Yao et al. |
| 2012/0212457 A1 | 8/2012 | Drumm |
| 2012/0212458 A1 | 8/2012 | Drumm |
| 2012/0218229 A1 | 8/2012 | Drumm |
| 2012/0306793 A1 | 12/2012 | Liu et al. |
| 2013/0044071 A1 | 2/2013 | Hu et al. |
| 2013/0127788 A1 | 5/2013 | Drumm |
| 2013/0135259 A1 | 5/2013 | King et al. |
| 2013/0141395 A1 | 6/2013 | Holmgren et al. |
| 2013/0215034 A1 | 8/2013 | Oh et al. |

FOREIGN PATENT DOCUMENTS

| | | |
|---|---|---|
| JP | 11-232024 A | 8/1999 |
| WO | 8600446 A1 | 1/1986 |
| WO | 8600447 A1 | 1/1986 |
| WO | 2008004103 A1 | 1/2008 |
| WO | 2008133941 A1 | 11/2008 |
| WO | 2010015408 A1 | 2/2010 |
| WO | 2010134865 A1 | 11/2010 |

OTHER PUBLICATIONS

Moeller et al., ZeroTouch: A Zero-Thickness Optical Multi-Touch Force Field, CHI EA '11 Proceedings of the 2011 Annual Conference Extended Abstracts on Human Factors in Computing Systems, pp. 1165-1170, ACM, New York, NY, May 2011.

Moeller et al., IntangibleCanvas: Free-Air Finger Painting on a Projected Canvas, CHI EA '11 Proceedings of the 2011 Annual Conference Extended Abstracts on Human Factors in Computing Systems, pp. 1615-1620, ACM, New York, NY, May 2011.

Moeller et al., Scanning FTIR: Unobtrusive Optoelectronic Multi-Touch Sensing through Waveguide Transmissivity Imaging, TEI '10 Proceedings of the Fourth International Conference on Tangible, Embedded, and Embodied Interaction, pp. 73-76, ACM, New York, NY, Jan. 2010.

Van Loenen et al., Entertaible: A Solution for Social Gaming Experiences, Tangible Play Workshop, pp. 16-19, Tangible Play Research and Design for Tangible and Tabletop Games, Workshop at the 2007 Intelligent User Interfaces Conference, Workshop Proceedings, Jan. 28, 2007.

Johnson, M., "Enhanced Optical Touch Input Panel", IBM Technical Disclosure Bulletin vol. 28, No. 4, pp. 1760-1762, Sep. 1985.

\* cited by examiner

FALSE POSITIVE

PARALLAX EFFECT

PARALLAX EFFECT

INTEGRATED LIGHT GUIDE AND TOUCH SCREEN FRAME AND MULTI-TOUCH DETERMINATION METHOD

CROSS REFERENCES TO RELATED APPLICATIONS

This application claims priority benefit of U.S. Provisional Patent Application No. 62/054,353, entitled INTEGRATED LIGHT GUIDE AND TOUCH SCREEN FRAME AND MULTI-TOUCH DETERMINATION METHOD, filed on Sep. 23, 2014 by inventors Saska Lindfors, Robert Pettersson, John Karlsson and Thomas Eriksson.

FIELD OF THE INVENTION

The field of the present invention is light-based touch screens.

BACKGROUND OF THE INVENTION

In computing, multi-touch refers to a touch sensing surface's ability to recognize the presence of two or more points of contact with the surface. This plural-point awareness is often used to implement advanced functionality such as pinch to zoom or activating predefined programs (Wikipedia, "multi-touch"). The Windows 8 operating system from Microsoft Corporation requires a touch screen supporting a minimum of 5-point digitizers. WINDOWS is a registered trademark of Microsoft Corporation.

The present invention relates to light-based touch sensitive surfaces. Light-based touch sensitive surfaces surround the surface borders with light emitters and light detectors to create a light beam grid above the surface. An object touching the surface blocks a corresponding portion of the beams.

Reference is made to FIG. 1, which is a diagram of a prior art, light-based touch screen having 16 LEDs and 16 PDs. Screen 801 in FIG. 1 is surrounded by emitters 101 along two edges and photodiode (PD) receivers 201 along the remaining two edges, which together emit and receive a lattice of light beams 300 covering the screen.

Light-based touch detection systems are unable to accurately recognize many instances of two or more points of contact with the surface. Reference is made to FIGS. 2 and 3, which are illustrations of instances of ambiguous multi-touch detections in prior art touch screens. FIGS. 2 and 3 show different instances of two, diagonally opposed touches 901 and 902 that are ambiguous vis-à-vis the light grid of FIG. 1. As shown in FIGS. 2 and 3, the same light beams are blocked in both instances.

There is further ambiguity when more than two objects touch the screen simultaneously. Reference is made to FIGS. 4 and 5, which are illustrations of instances of ghosted touches in prior art touch screens. The two-touch cases shown in FIGS. 2 and 3 are also ambiguous vis-à-vis the three-touch case, 901-903, shown in FIG. 4, and vis-à-vis the four-touch case, 901-904, shown in FIG. 5. In each of the cases illustrated in FIGS. 2-5, row and column PDs a-h show an absence of light in the same locations. The ambiguity illustrated in FIGS. 4 and 5 is caused by "ghosting", which refers to an effect where the shadow of a first object obscures a second object and prevents the second object from being detected.

Reference is made to FIG. 6, which is an illustration of a prior art method of disambiguating multi-touch detections in prior art touch screens. The real touches shown in FIG. 6 are at locations A and B. They both block light in the X and Y directions, and this is detected on the right and bottom edges. However, it is possible to add touches at locations C and D without any effect to the light blocking pattern. With the available data it is not possible to determine what the real touch points are, and whether there are in fact 2, 3 or 4 of them.

As shown in FIG. 6, prior art methods of disambiguating multi-touches rely on additional light beam directions, to create a less ambiguous blocking pattern. For example, adding diagonally-oriented beams (arrow 1) to the scenario in FIG. 6 reveals that C and D are not touch locations because diagonal beams would pass unblocked. On the other hand, if there were really three touches, say, A, B and C, it would not be possible to distinguish whether the third touch is at C or D or both. In order to do so, a second diagonal direction is added (arrow 2).

FIGS. 1-6 are simplified in that they show touch sizes that are uniform and locations that are neatly aligned with the light beams. In reality, though, some touches may partially block more than one beam while still shadowing each other. Even with a large number of beam directions some touch configurations generate a blocking pattern with ambiguous or surplus touch location candidates. Furthermore, the detection data is not perfect which makes it difficult to perform direct geometric calculations on the touch locations.

Reference is made to FIG. 7, which is a prior art blocking pattern of light intensity from measured five-touch data. Each blocked light beam has been shadowed according to its blocking level. It is easy to see, based on the blocking pattern, that there could be more than ten touches. The real touches are not even placed on the most blocked locations. Had they not been highlighted in FIG. 7, it would have been impossible to pinpoint them from the blocking pattern.

The present invention also relates to integrated casings for optical touch screen displays in which the outer casing, or housing, for the display is a light guide for guiding light from emitters mounted within the housing over and across the screen surface, and for guiding beams that have crossed the screen surface to light receivers mounted within the housing.

SUMMARY

Embodiments of the present invention provide improved multi-touch detection methods that eliminate ghosting and unambiguously identify touch locations, based on blocked light beams. The methods of the present invention also detect moving multi-touch locations.

Embodiments of the present invention also provide an integrated display frame and light guide which wraps around the outside to the front of the monitor or All-in-One (AiO) device. In some embodiments the light guide is made of clear plastic making the frame almost invisible at first glance.

There is thus provided in accordance with an embodiment of the present invention a touch screen assembly including a display screen, a plurality of infra-red LEDs operative to emit light when activated, a plurality of photo diodes operative to detect amounts of light received when activated, a transparent plastic frame including an exposed upper edge along the entire frame perimeter, vertically straight inner walls, extending from below the display screen to the exposed upper edge of the frame, along the entire frame perimeter, and internally reflective facets for directing light, emitted by the infra-red LEDs, along light paths that travel upward through one side of the frame along the height of the inner walls, over the display screen, downward through the opposite side of the frame along the height of the inner walls, and onto the photo diodes, and a processor coupled with the infra-red LEDs and the photo diodes, operative to selectively activate the infra-red LEDs and the photo diodes, to identify a location of an object touching the display screen from above, based on amounts of light detected by activated photo diodes when light emitted by activated infra-red LEDs is blocked along its light path by the object.

There is additionally provided in accordance with an embodiment of the present invention a touch screen assembly, including a curved display screen, a plurality of LEDs, mounted underneath the display screen, operative to emit light when activated, a plurality of photo diodes, mounted underneath the display screen, operative to detect amounts of light received when activated, a frame including internally reflective surfaces that guide light emitted by the LEDs along light paths that travel upwards, across the display screen in segments that follow the contour of the display screen, and downwards to the photo diodes, wherein the frame is oriented such that some of the light paths are incident upon and reflect off of the display screen while crossing said display screen, and a processor coupled with the LEDs and the photo diodes, operative to selectively activate the LEDs and the photo diodes, and to identify a location of an object touching the display screen, based on amounts of light detected by activated photo diodes when light emitted by activated LEDs is blocked by the object along its light path.

There is further provided in accordance with an embodiment of the present invention a touch screen assembly including a display screen, a plurality of infra-red LEDs operative to emit light when activated, a plurality of photo diodes operative to detect amounts of light received when activated, a transparent plastic frame surrounding the display screen on four sides that guides light emitted by the infra-red LEDs to the photo diodes along light paths that travel into the frame on one side, over the display screen, and into the frame on the opposite side, and a processor coupled with the infra-red LEDs and the photo diodes, operative to selectively activate the infra-red LEDs and the photo diodes, to identify a location of an object touching the display screen from above, based on amounts of light detected by activated photo diodes when light emitted by activated infra-red LEDs is blocked along its light path by the object, and to recognize the object touching the frame, based on amounts of light detected by activated photo diodes when light emitted by activated infra-red LEDs is absorbed along its light path by the object, thereby providing light-based touch sensitivity to the display screen and to the frame.

BRIEF DESCRIPTION OF THE DRAWINGS

The present invention will be more fully understood and appreciated from the following detailed description, taken in conjunction with the drawings in which.

DETAILED DESCRIPTION

Aspects of the present invention relate to light-based touch screens and light-based touch surfaces. Throughout this specification, the terms "touch screen" and "touch sensitive surface" include touch sensitive electronic displays and touch surfaces that do not include an electronic display, inter alia, a mouse touchpad as included in many laptop computers and the back cover of a handheld device. They also include airspace enclosed by the rectangular emitter-detector sensor frame provided by the present invention. They also include airspace bordered on only one edge by a linear emitter-detector array whereby light projected into the airspace by the emitters is reflected by the touch object onto the reflectors.

According to embodiments of the present invention, a light-based touch sensor includes a plurality of infra-red or near infra-red light-emitting diodes (LEDs) arranged along two adjacent edges of a rectangular touch sensitive surface, as defined above, and a plurality of photodiodes (PDs) arranged along the two remaining adjacent edges. When light projected by the LEDs is blocked by an inserted object, such as a finger or a stylus, the absence of expected light is detected by the PDs. The LEDs and PDs are controlled for selective activation and de-activation by a controller. Generally, each LED and PD has I/O connectors, and signals are transmitted to specify which LEDs and which PDs are activated.

Figure 8:
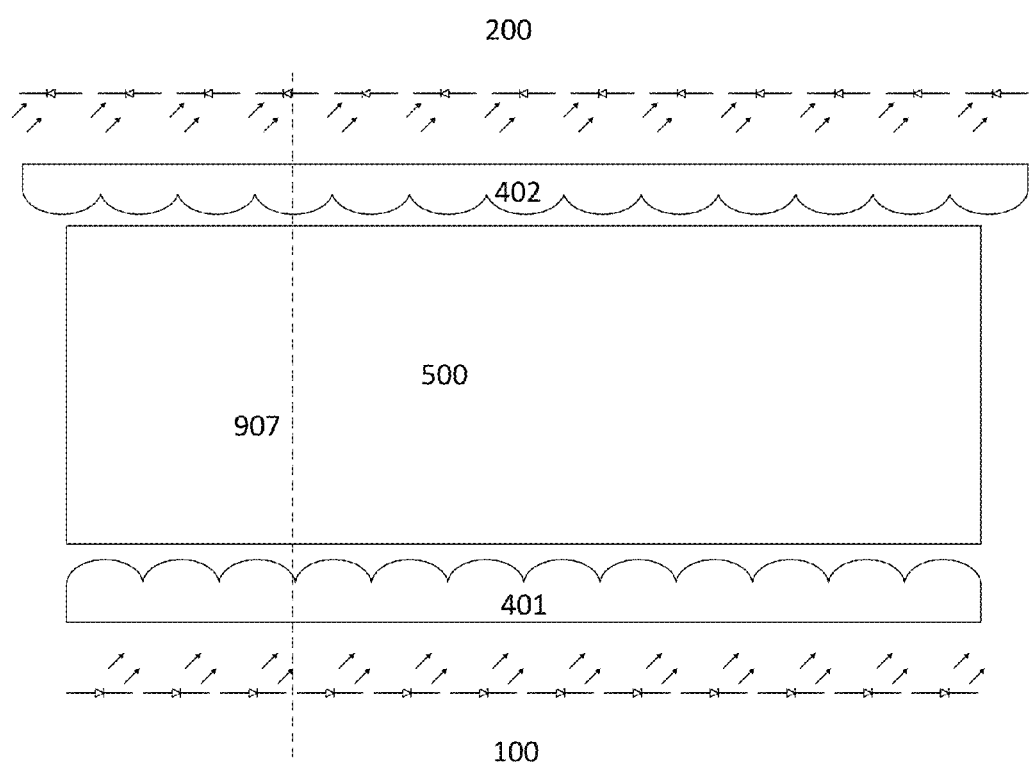
FIG. 8 is an illustration of a touch screen, in accordance with an embodiment of the present invention.

Reference is made to FIG. 8, which is an illustration of a touch screen, in accordance with an embodiment of the present invention. FIG. 8 shows an arrangement of emitters 100 and receivers 200 along opposite edges of touch screen 500. Emitter lenses 401 and receiver lenses 402 are also shown. Vertical line 907 shows that the emitters 100 are shift-aligned with the receivers 200 and that emitter lenses 401 are shift-aligned with receiver lenses 402. Although FIG. 8 shows emitters and receivers along only two edges of screen 500, a similar arrangement of emitters and receivers is present along the remaining two edges as well.

Figure 9:
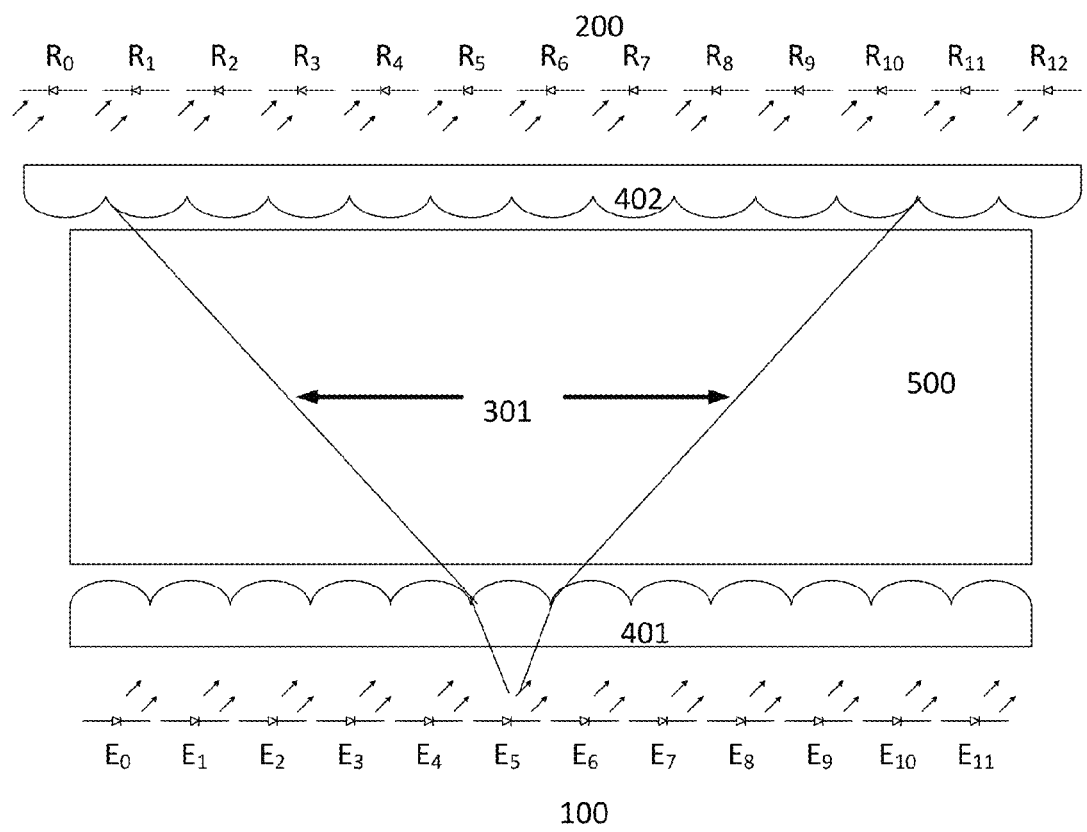
FIG. 9 is an illustration of a light beam from one emitter projected across a touch screen, in accordance with an embodiment of the present invention.

Reference is made to FIG. 9, which is an illustration of a light beam from one emitter projected across a touch screen, in accordance with an embodiment of the present invention. FIG. 9 shows how emitter lenses 401 spread the light from each emitter 100 into a wide beam. Wide beam 301 is projected by emitter $E_5$. Receiver lenses 402 provide a wide viewing angle for each receiver 200, similar in scope to that illustrated by wide beam 301. The emitters 100 are listed as $E_0$-$E_{11}$ and the receivers 200 are listed as $R_0$-$R_{12}$.

Figure 10:
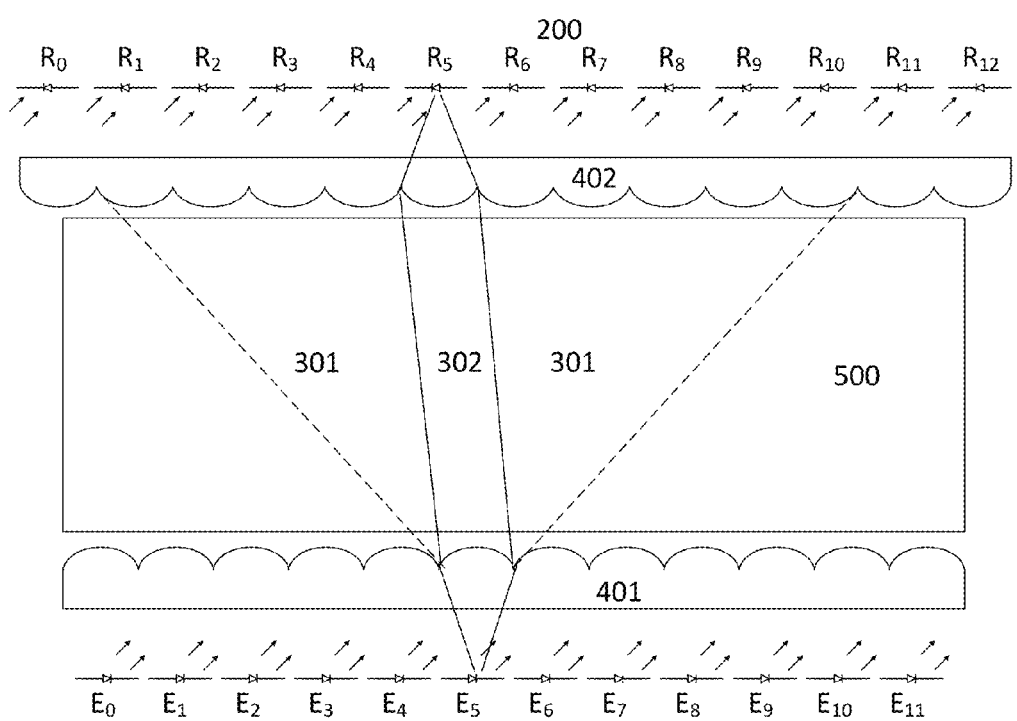
FIGS. 10 and 11 are illustrations of portions of the light beam from one emitter detected by two different receivers, in accordance with an embodiment of the present invention.
Figure 11:
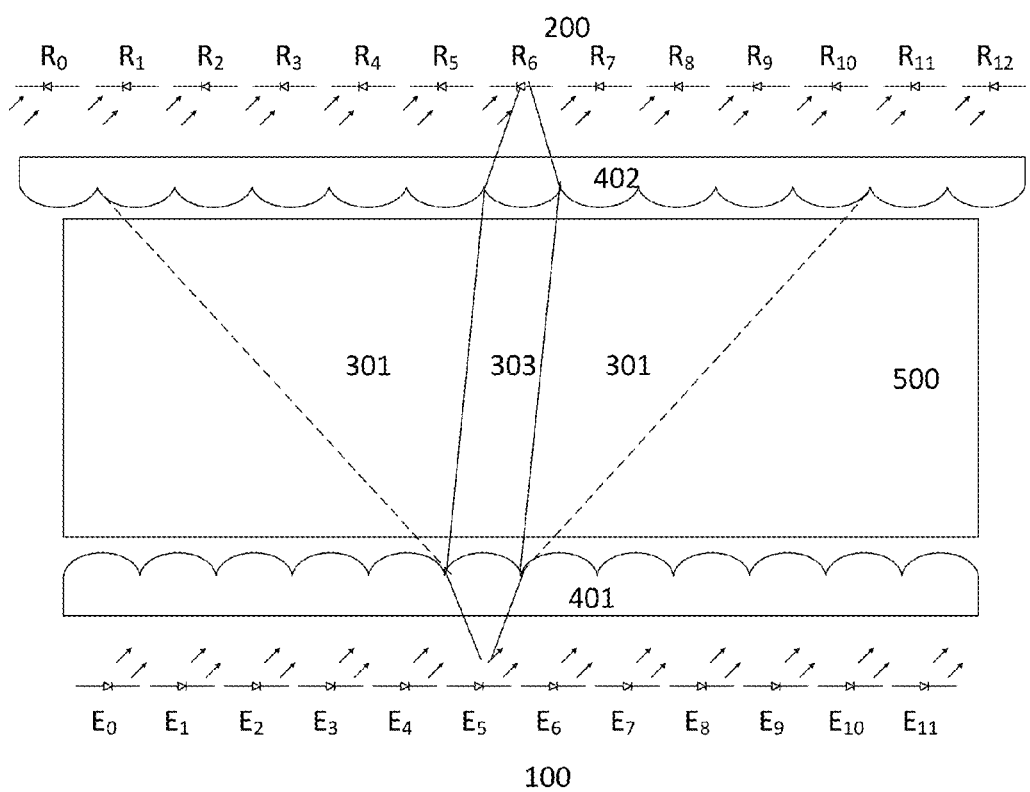

Reference is made to FIGS. 10 and 11, which are illustrations of portions of the light beam from one emitter detected by two different receivers, in accordance with an embodiment of the present invention. FIG. 10 shows that a portion 302 of a wide beam 301 from each emitter is detected by a respective receiver. Thus, wide beam 302 is the portion of wide beam 301 detected by receiver $R_5$. Wide beam 302 is shaped as a parallelogram that spans the width of the emitter lens associated with emitter $E_5$ and the width of the receiver lens associated with receiver $R_5$.

FIG. 11 shows that another portion 303 of wide beam 301 from each emitter is detected by a different respective receiver. Thus, wide beam 303 is the portion of wide beam 301 detected by receiver $R_6$. Wide beam 303 is shaped as a parallelogram that spans the width of the emitter lens associated with emitter $E_5$ and the width of the receiver lens associated with receiver $R_6$.

Figure 12:
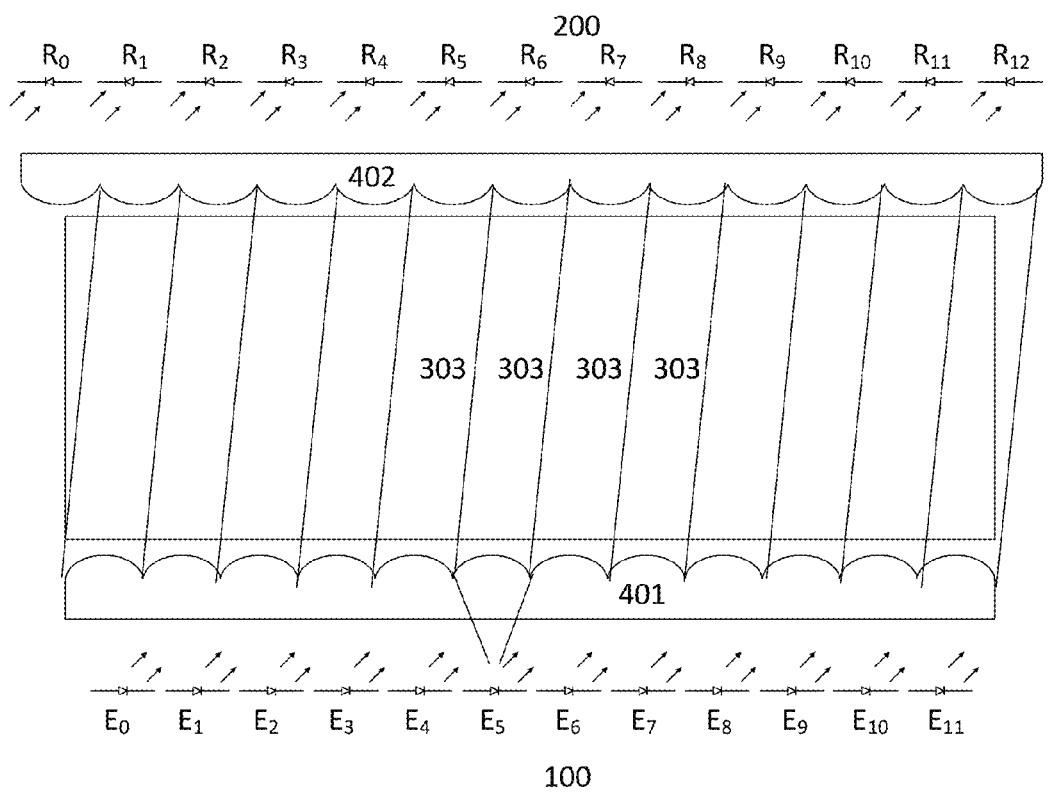
FIGS. 12-14 are illustrations of sets of detected light beams, in accordance with an embodiment of the present invention.
Figure 13:
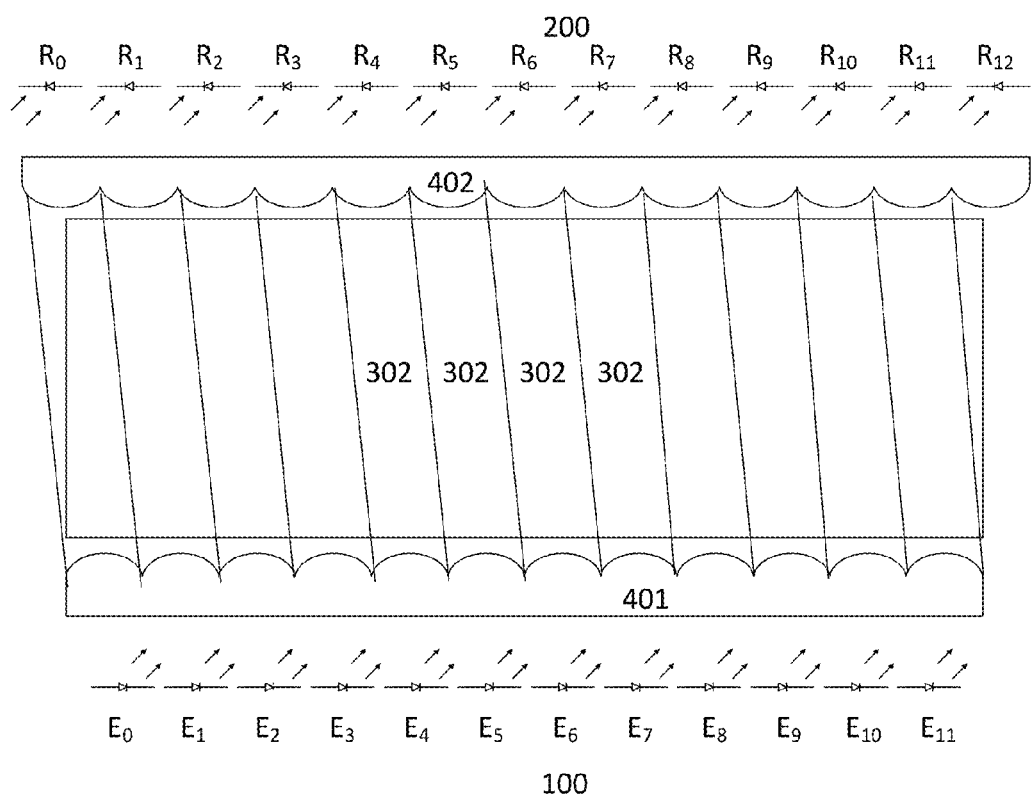
Figure 14:
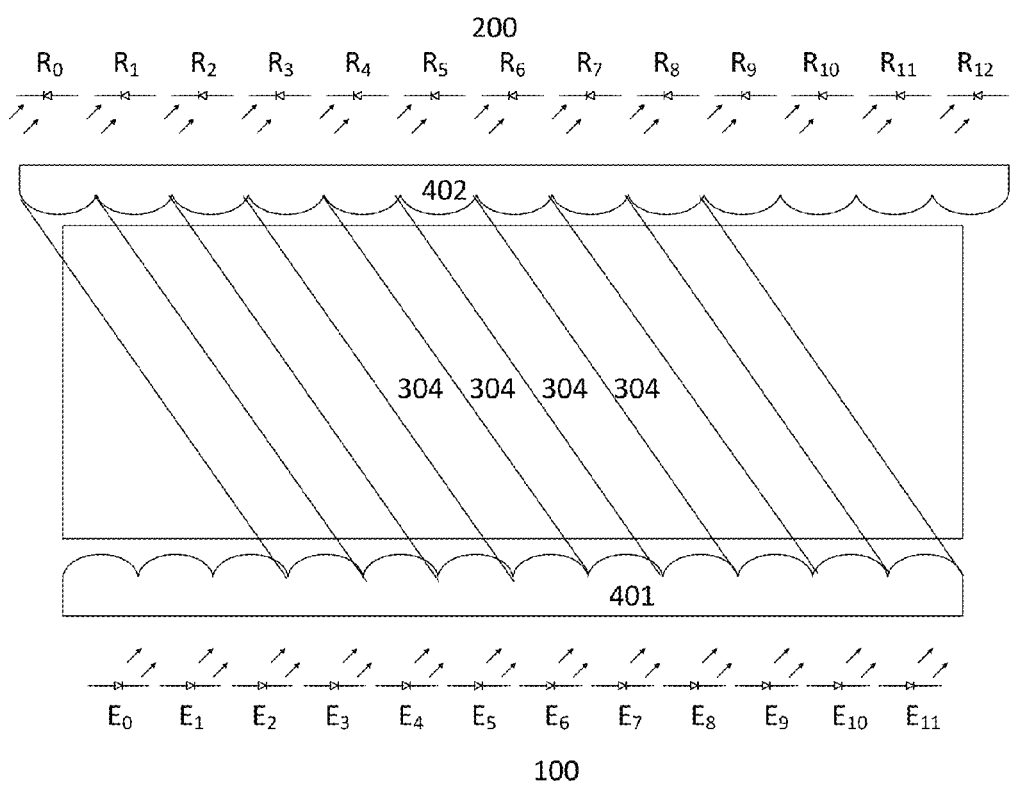

Reference is made to FIGS. 12-14, which are illustrations of sets of detected light beams, in accordance with an embodiment of the present invention. FIG. 12 shows that a set of beams is formed by portion 303 of each emitter beam detected by a respective receiver. The set of beams 303 provides continuous detection of an inserted pointer anywhere between the first and last beam 303, as neighboring beams 303 are adjacent one another.

FIG. 13 shows that a second set of beams is formed by portion 302 of each emitter beam detected by a different respective receiver than that of beam 303. This set of beams 302 also provides continuous detection of an inserted pointer anywhere between the first and last beam 302, as neighboring beams 302 are adjacent one another.

FIG. 14 shows a third set of beams formed by portion 304 of each emitter beam detected by a different respective receiver than those of beams 302 and 303. Thus, whereas light from each emitter is detected by multiple receivers, in some embodiments of the present invention the beams are grouped into sets of similar beams. Namely, each set is formed by pairing each emitter with a respective one of the receivers, where the offset between each emitter and its respective receiver is the same.

One advantage of grouping the beams this way is that beams within each group do not intersect. Therefore, when multiple objects are detected within a set of beams the system can identify their relative placement to one another along the axis that the emitters are situated along. In contrast, when analyzing a many-to-many configuration of detection beams in which intersecting beams are analyzed together it is often not possible to determine the relative positions of the detected objects. For example, when two objects a and b are detected by two intersecting beams, it is not known whether a is to the left of b or to the right, because it is unknown if a and b are situated above or below the point of intersection between the two detecting beams. This advantage is elaborated below.

According to embodiments of the present invention a plurality of light pulse emitters, $E_1, \ldots, E_n$, is arranged such that each emitter, E, transmits light pulses, denoted $E(\theta_1), \ldots, E(\theta_n)$, that are directed in directions, $\theta_1 \ldots \theta_n$, outward from an edge of the display and over the display, for detection by n light pulse detectors situated along the perimeter of the display. Each light pulse $E(\theta)$ is directed through a lens to create a wide light pulse such that light pulses from neighboring emitters $E_m$ and $E_{m+1}$, directed at a same angle $\theta_b$, are substantially contiguous. Each such set of parallel beams is thus denoted $E_1(\theta_a), \ldots, E_n(\theta_a)$.

In response to a single touch on the display each set of parallel beams identifies a respective touch location, corresponding to one or more light pulses $E_i(\theta_j)$ that is at least partially blocked by the touch, and having (a) a normalized touch value between 0 and 1, denoted $W(E_i(\theta_j))$, according to the percentage of blockage of light pulse $E_i(\theta_j)$ by the touch, and (b) a respective screen coordinate, denoted $X(E_i(\theta_j))$. A touch coordinate, denoted XT, is calculated by interpolating the screen coordinates of the identified touch locations according to the identified touch locations' normalized touch values, $$XT = \Sigma W(E_i(\theta_j)) * X(E_i(\theta_j)) \quad (1)$$

When an unambiguous pattern of one or more touches is detected, an interpolation of touch locations from even only a few sets of parallel beams, e.g., 2-6 sets, provides a highly accurate touch coordinate. The fewer touch locations required for interpolation the faster the scanning speed and/or the lower the power required per screen scan. When the possibility of ghosting is determined present in one or more locations on the screen, the system scans additional sets of parallel beams $E_1(\theta_a), E_n(\theta_a), E_1(\theta_b), \ldots E_n(\theta_b), \ldots E_1(\theta_m), \ldots E_n(\theta_m)$. In some embodiments, the area containing the potential ghosting is identified, and only a subset of each additional set of beams that traverses the potential ghosting area is activated. The additional sets of beams resolve the ghosting ambiguity in two stages. The first is explained presently, and the second is described beginning at the section entitled Ghost Point Elimination.

Using few sets of parallel beams, e.g., two sets, for each of the x and y axes, touch locations are detected. Discussion now turns to resolving whether the detected touch is caused by one touch object or by a multi-touch, namely, a plurality of separate simultaneous touches. One axis—the x-axis, is discussed, but a similar process is performed for the y-axis. When a possible multi-touch is detected, the screen is logically divided into strips parallel to the axis whose coordinates the system is analyzing. Thus, when determining x-axis coordinates, the screen is logically divided into strips each strip crossing the width of the screen at a different y coordinate. A segment within each strip, containing the possible multi-touch, is identified based on the initial few sets of parallel beams. Next, the system determines which beams, in each additional set of parallel beams, cross the thus identified segment. The result is a table looking like this:

| | Start and end emitters whose beams cross the identified segment | | | | |
|---|---|---|---|---|---|
| Strip y-coordinate | $\Theta_1$ Set | $\Theta_2$ Set | $\Theta_3$ Set | ... | $\Theta_n$ Set |
| 0 | {$E_3$-$E_7$} | {$E_3$-$E_7$} | {$E_5$-$E_{10}$} | ... | ... |
| 1 | ... | ... | ... | ... | ... |
| ... | ... | ... | ... | ... | ... |
| Max y | ... | ... | ... | ... | ... |

Next, the system activates the sets of additional beams in the table. As mentioned above, neighboring parallel beams in each set are substantially contiguous. Thus, a case of two touches is distinguished from a case of one touch if the pattern of touch detections within a series of neighboring parallel beams has more than one peak. This is explained with reference to FIGS. 15-17.

Figure 15:
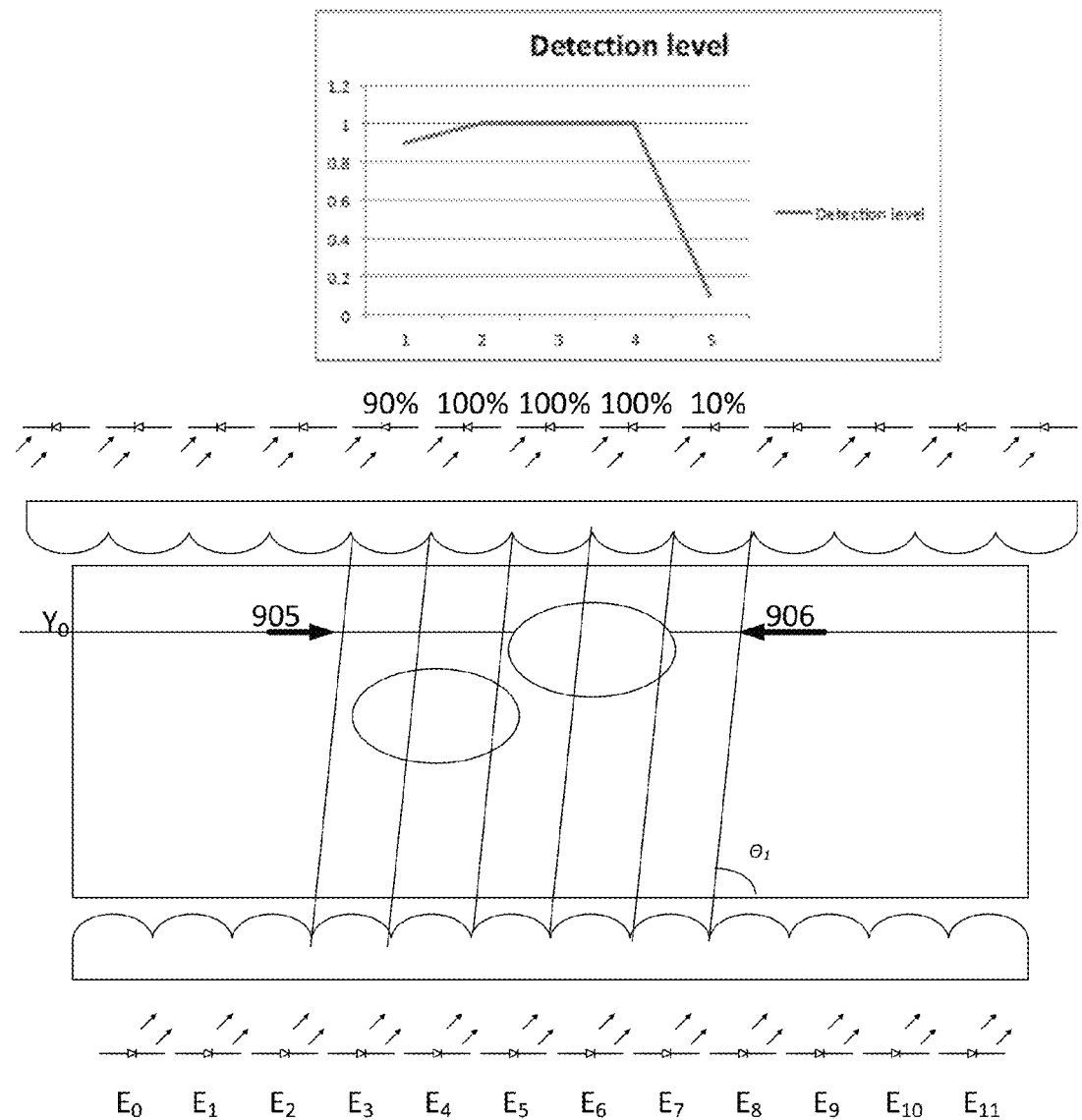
FIGS. 15-17 are illustrations of touch detections in different sets of light beams, in accordance with an embodiment of the present invention.
Figure 16:
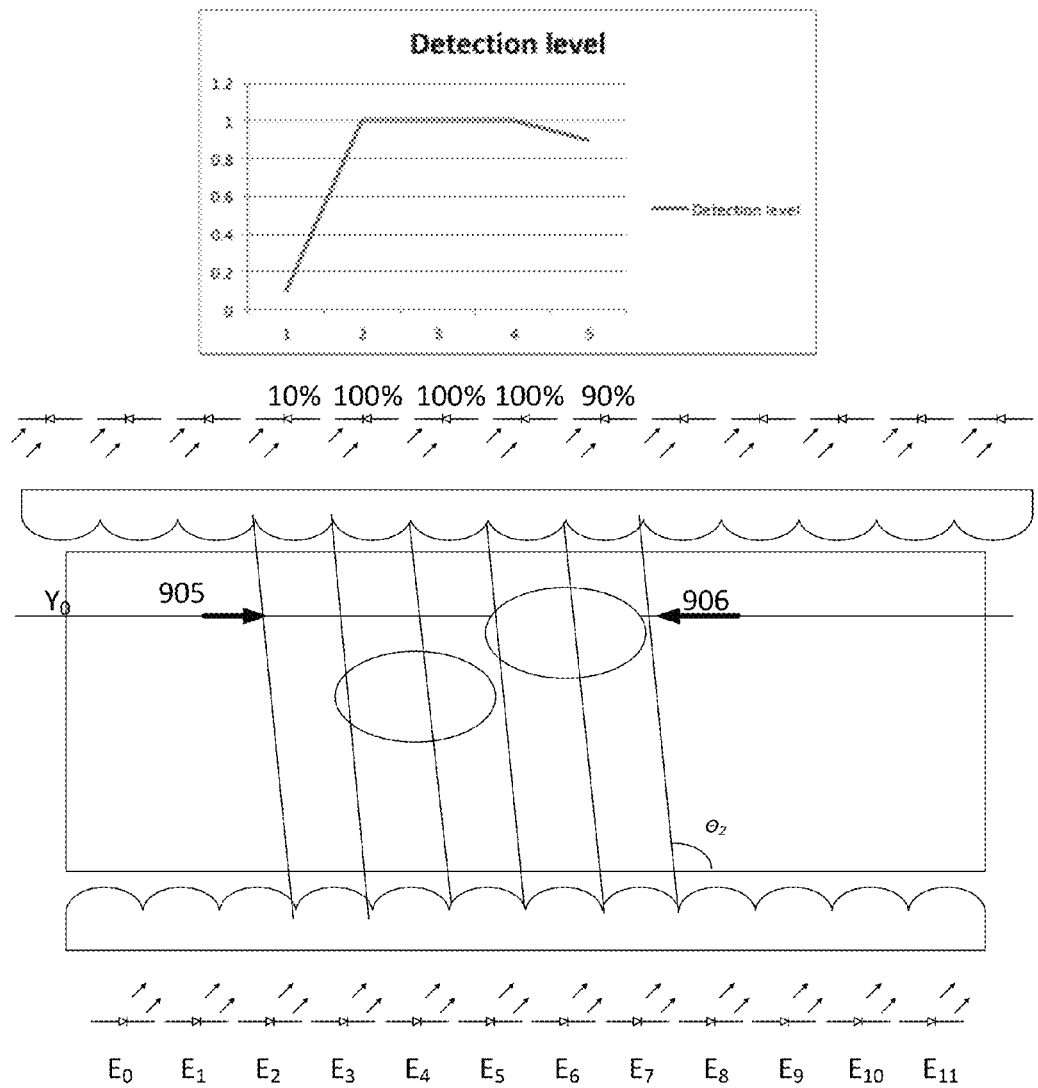
Figure 17:
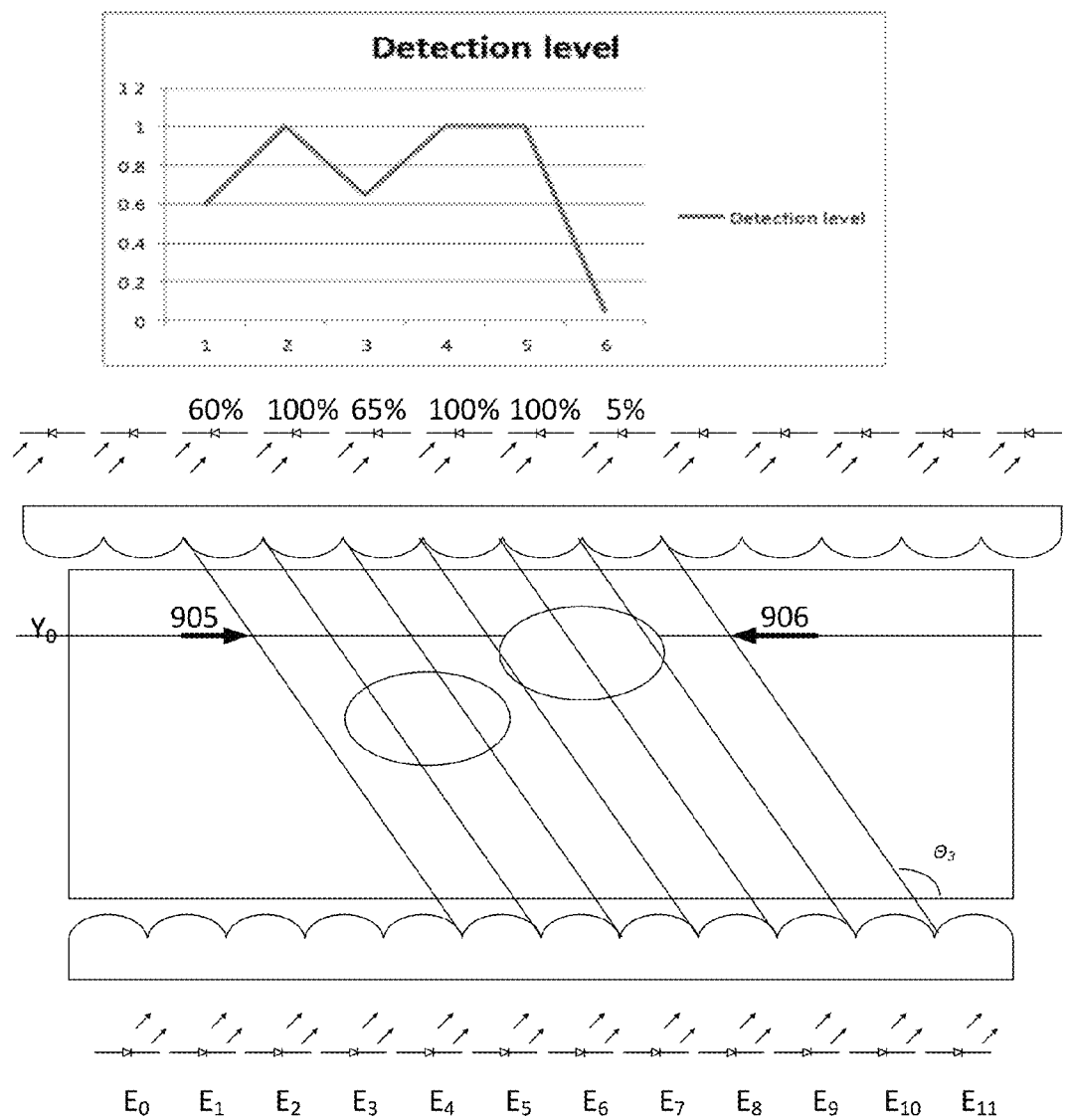

Reference is made to FIGS. 15-17, which are illustrations of touch detections in different sets of light beams, in accordance with an embodiment of the present invention. FIG. 15 illustrates a case in which multiple blocked beams indicate a possible situation of multiple touches. As described above, the screen is divided into strips having different y-axis coordinates, and for each strip, a segment containing the touch detections is identified. In FIG. 15 the borders of the $Y_0$ segment are indicated by arrows 905 and 906. Within this segment lie the detections of beams from emitters $E_3$-$E_7$ in beam set $\Theta_1$. In FIGS. 15-17 the detection signal, i.e., the normalized touch value between 0 and 1 for each beam within the segment, is indicated above its respective receiver. Thus, the detections in FIG. 15 are 0.9, 1.0, 1.0, 1.0, 0.1, for beams from emitters $E_3$-$E_7$, respectively. A graph mapping these detections is rendered in the upper portion of FIGS. 15-17. The graph in FIG. 15 shows that the resulting detection signal pattern has only one peak.

FIG. 16 shows the detections of beams from emitters $E_3$-$E_7$ in beam set $\Theta_2$. The resulting detection signal pattern has only one peak.

FIG. 17 shows the detections of beams from emitters $E_5$-$E_{10}$ in beam set $\Theta_3$. For this set of beams the normalized touch values are 0.6, 1.0, 0.65, 1.0, 1.0, 0.05, respectively, and the resulting detection signal pattern has two peaks, indicating that there is a gap between touches somewhere within the detected wide beam generated by emitter $E_7$. The interruption between the two peaks is caused by a normalized touch value of 0.65. A beam having a normalized touch value of 0.65, when considered alone, indicates that a touch object is present. However, when considered in the context of its neighboring beams, the fact that this touch detection caused a trough in the graph between its two neighboring detections of 1.0, indicates that there are two separate touches in this case.

In prior art touch detection systems that activate many-to-many emitter-receiver pairs, certain ambiguities remain. For example, two intersecting beams are blocked by two touches 910 and 911, respectively. It is unclear whether the touches are located above the intersection point—and thus touch point 910 is to the left of touch point 911, or below the intersection point in which case touch point 910 is to the right of touch point 911.

Figure 18:
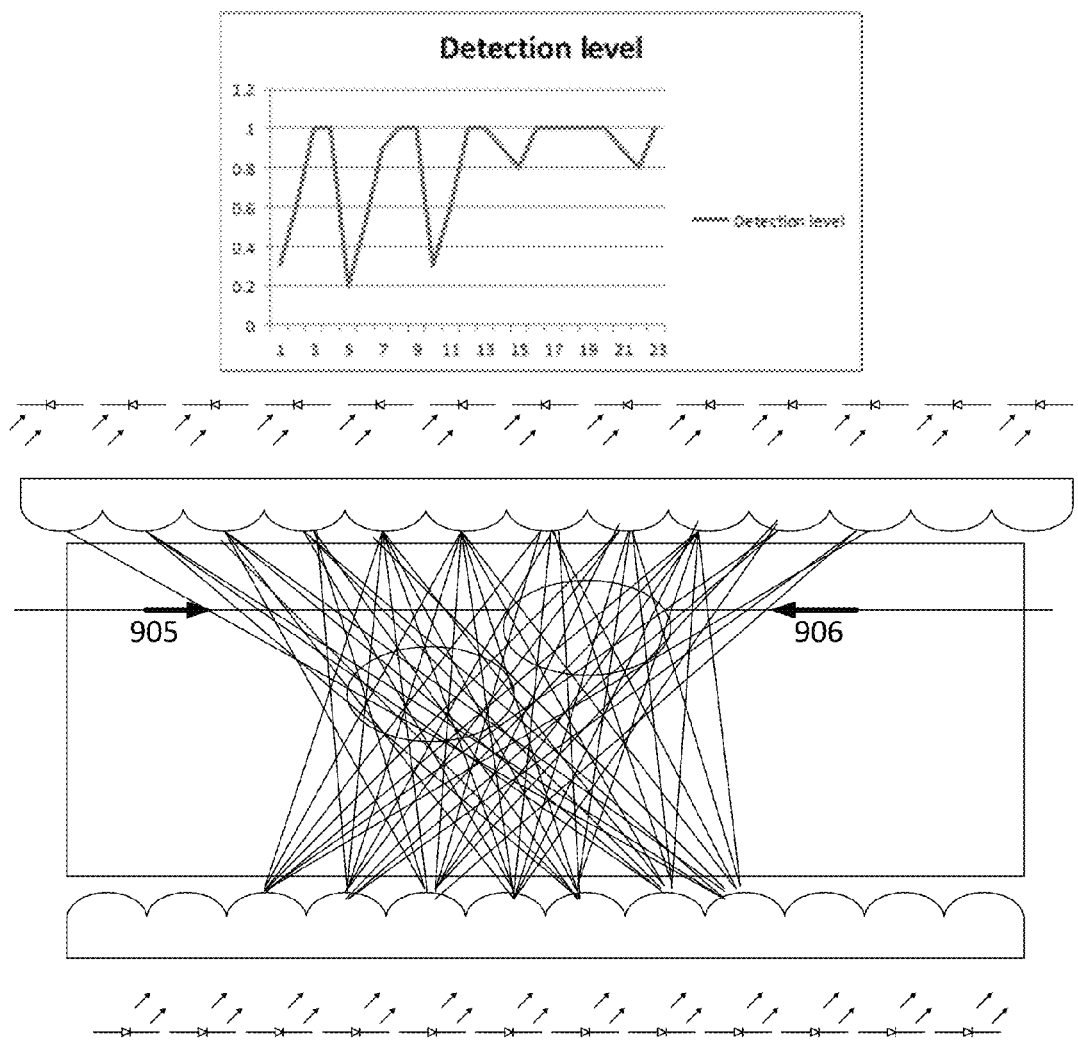
FIG. 18 is an illustration of touch detections in overlapping light beams being analyzed together, in accordance with an embodiment of the present invention.

Reference is made to FIG. 18, which is an illustration of touch detections in overlapping light beams being analyzed together, in accordance with an embodiment of the present invention. FIG. 18 shows an instance of ambiguity. In FIG. 18 all detections are combined into the graph at the top of the figure. The graph shows multiple peaks, making it difficult to determine how many touches exist. One of the factors contributing to the construction of this graph is that it is unclear how to order the data when combining signals for different intersecting beams, since the touch (or touches) contributing to the blockage can lie anywhere along the beam—namely, above or below any intersection between two beams.

Embodiments of the present invention resolve these ambiguities by analyzing each set of parallel beams separately. Within each set of beams, the beams do not intersect. Therefore, the ambiguity resulting from intersecting blocked beams does not exist.

Ghost Point Elimination

Figure 1:
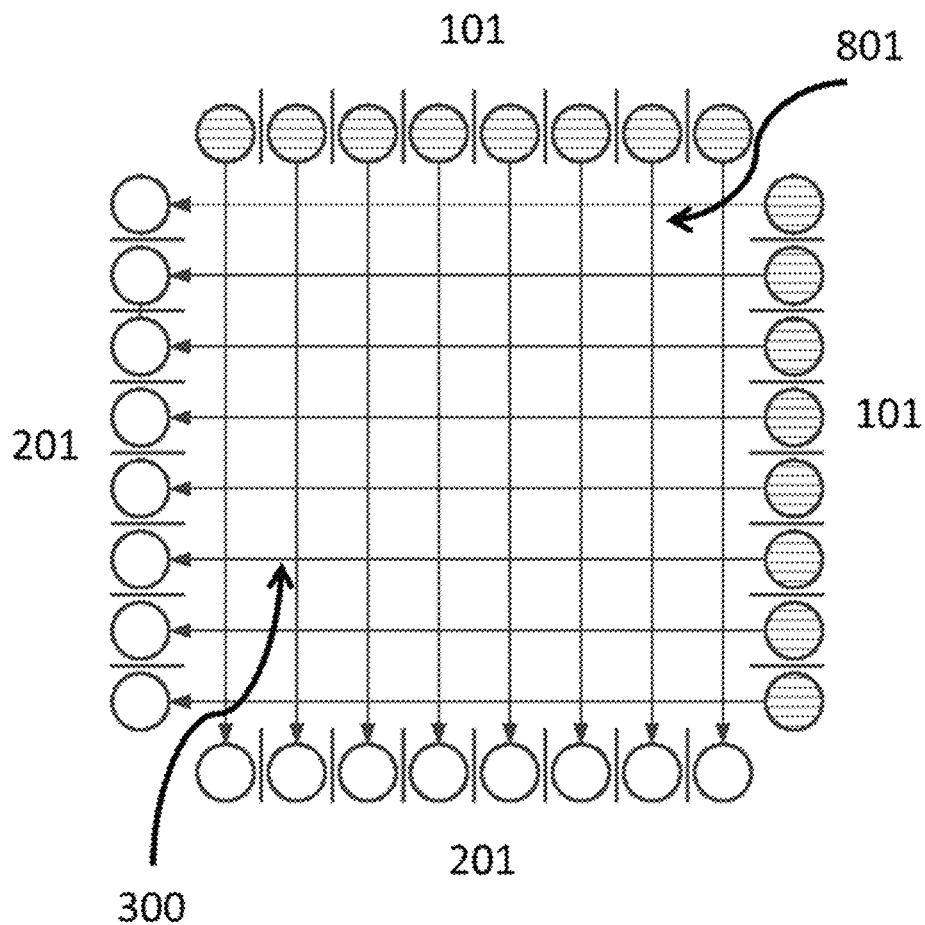
FIG. 1 is a diagram of a prior art, light-based touch screen having 16 LEDs and 16 PDs.
Figure 2:
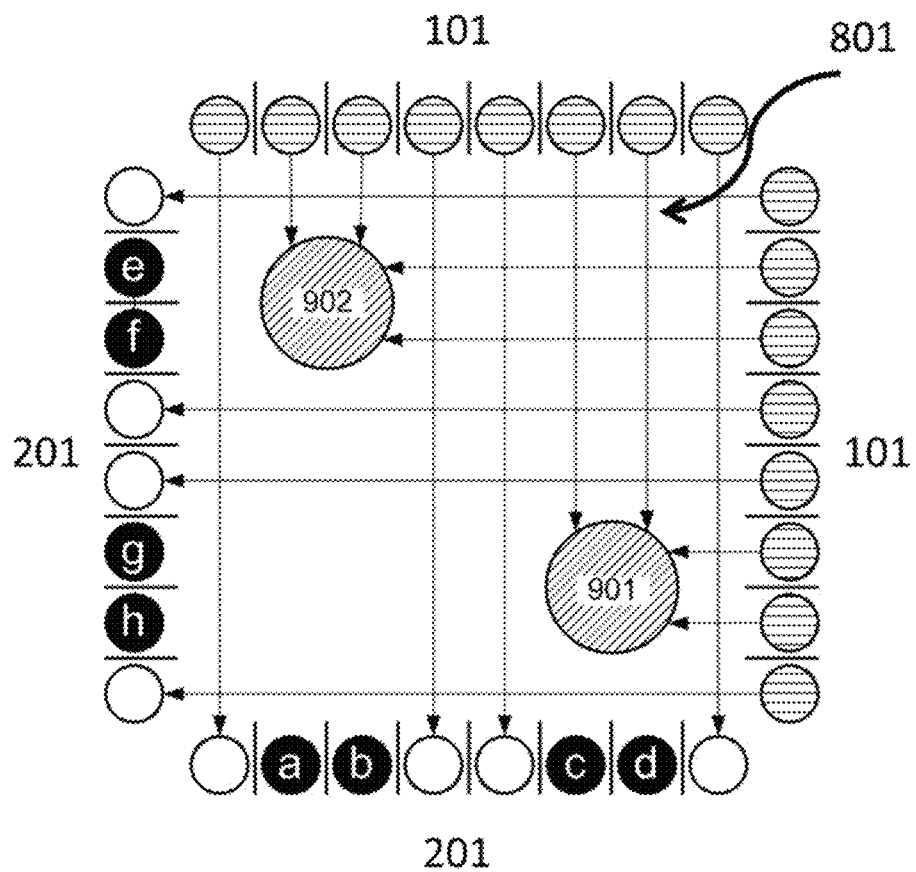
FIGS. 2 and 3 are illustrations of instances of ambiguous multi-touch detections in prior art touch screens.
Figure 3:
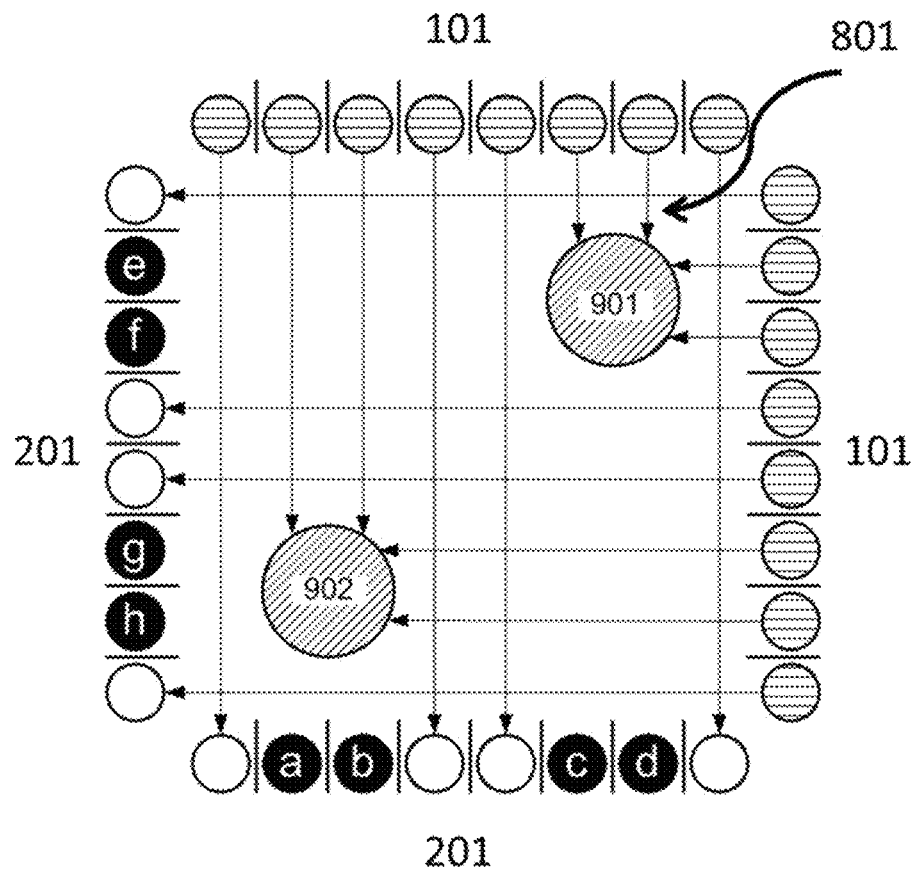
Figure 4:
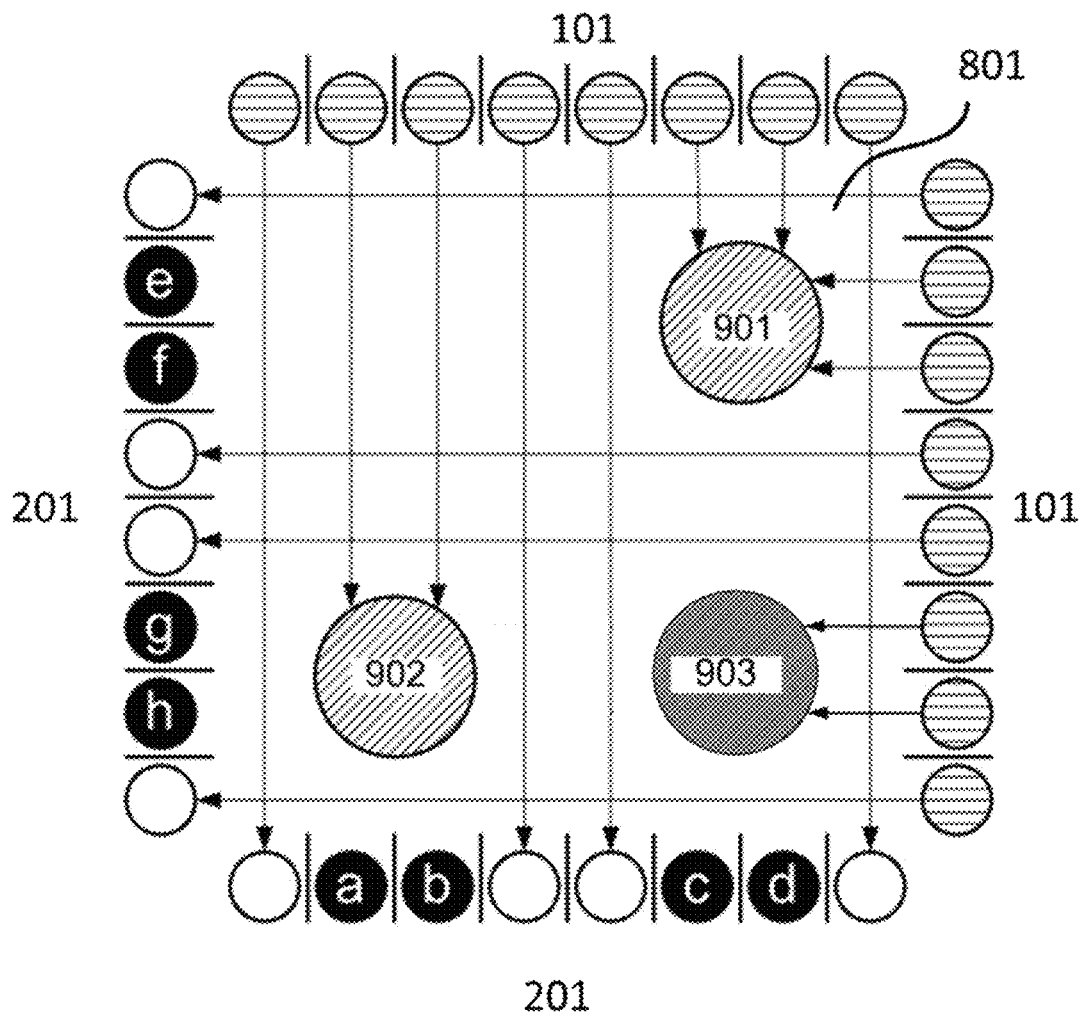
FIGS. 4 and 5 are illustrations of instances of ghosted touches in prior art touch screens.
Figure 5:
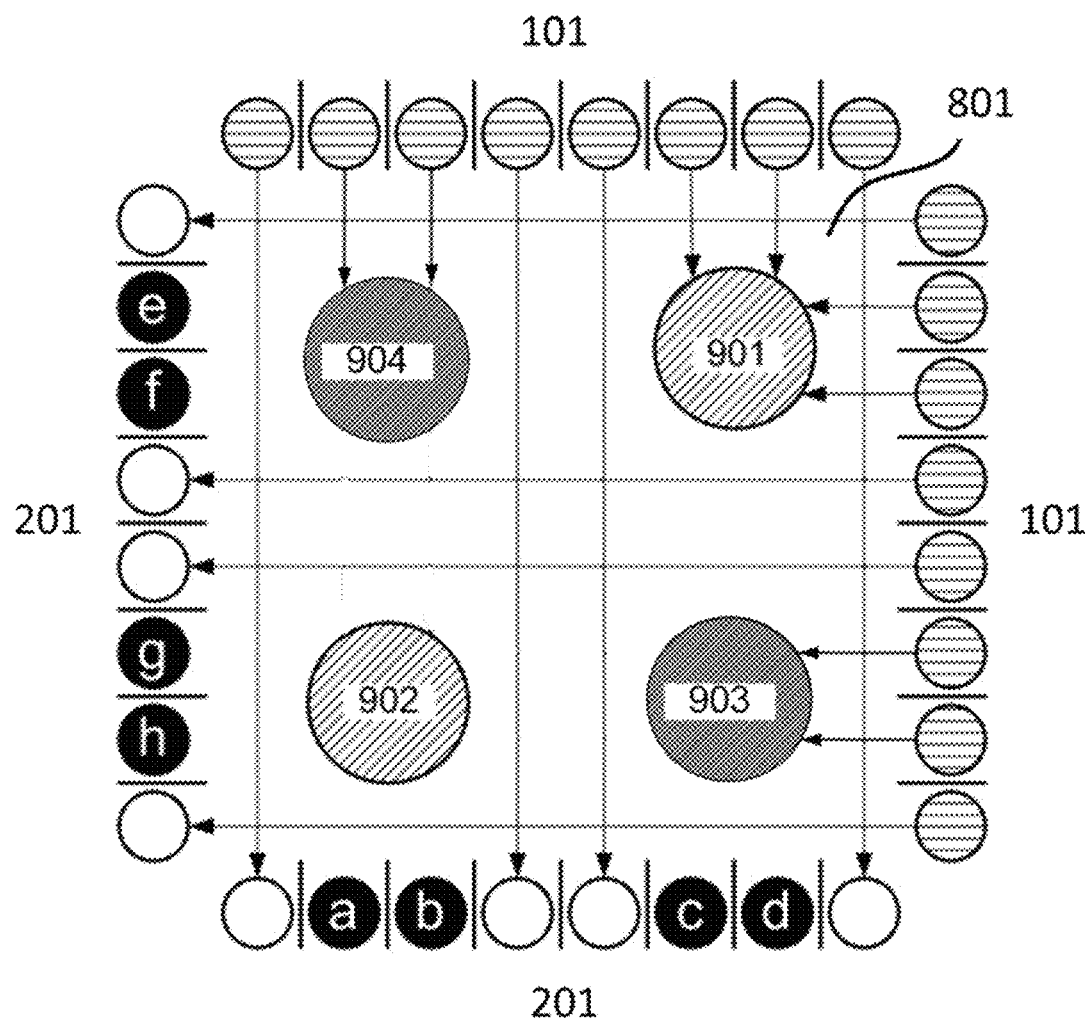
Figure 6:
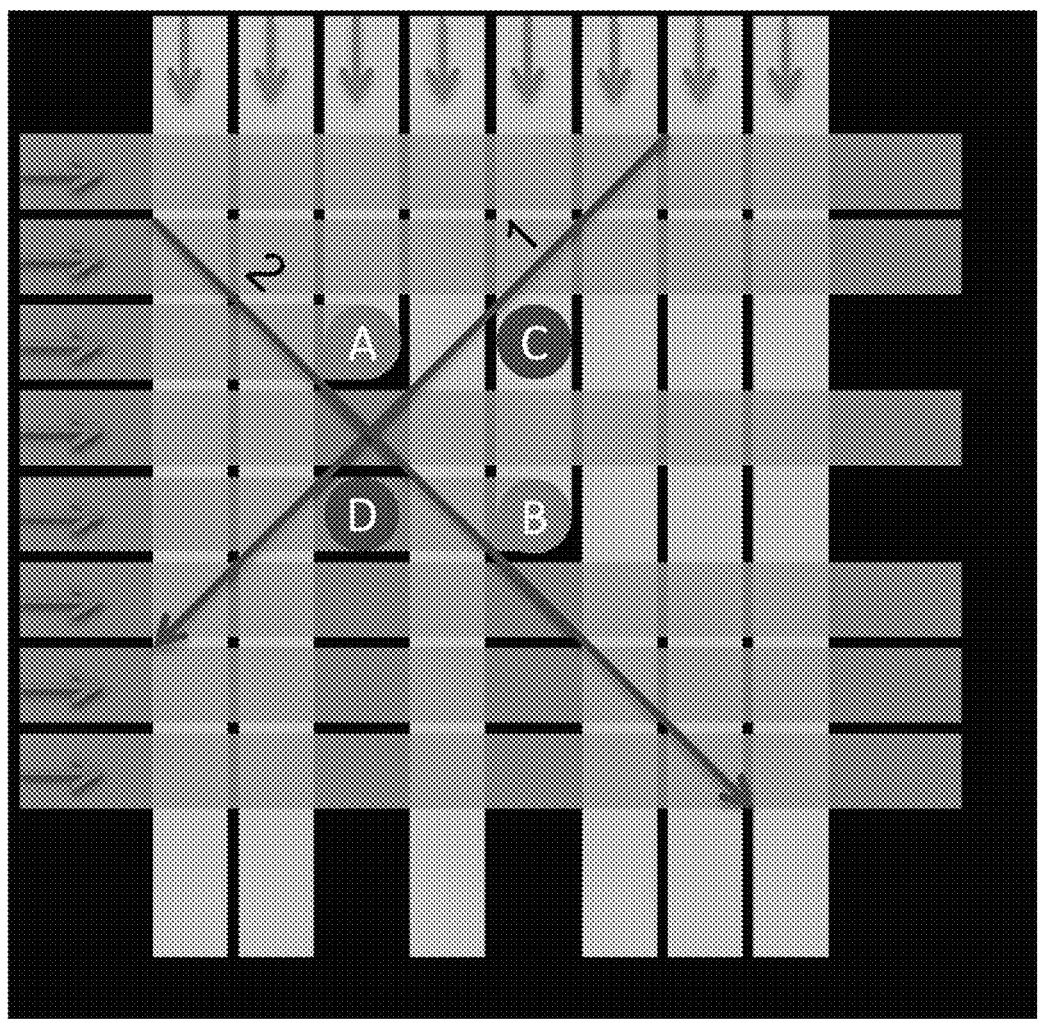
FIG. 6 is an illustration of a prior art method of disambiguating multi-touch detections in prior art touch screens.
Figure 7:
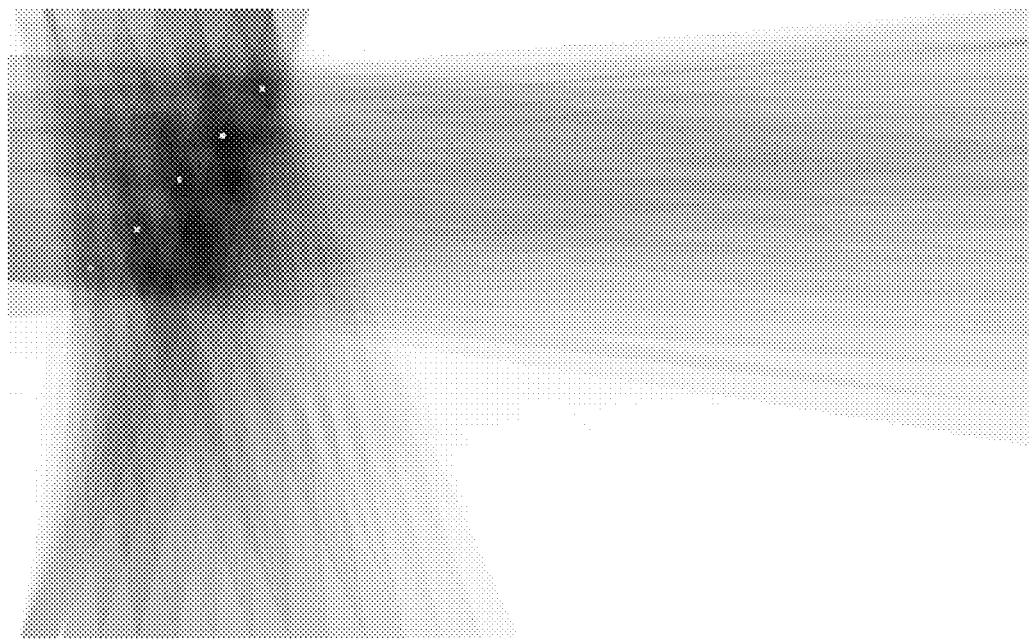
FIG. 7 is a prior art pattern of light intensity from measured five-touch data.

The blocking pattern, designated $\overline{m}$, shown in FIG. 7, is essentially an array of light intensities, $m_k$, at discrete locations, k=1, ..., N. The basic idea behind methods embodying the subject invention is that each touch must affect the detected blocking pattern. If a touch does not contribute to the light blocking in any way, it must be completely hidden by other touches and cannot be detected. Adding or removing a visible touch always alters the blocking pattern, which is a complex nonlinear function of all present touches.

In order to remove ghost touches a blocking pattern is calculated based on a candidate touch combination. The geometry of the light transmitters and receivers together with the candidate touch combination is used to model a blocking pattern, m, $$\overline{m} = f(\overline{x}, \overline{y}), \quad (2)$$

where $\overline{x} = (x_1, \ldots, x_n)$ and $\overline{y} = (y_1, \ldots, y_n)$ are coordinate vectors for n candidate touches, n being a number greater than or equal to one. The problem of multi-touch is thus the "inverse problem", of finding unknown touch coordinate vectors, $\overline{x}$ and $\overline{y}$, corresponding to a detected blocking pattern, $\overline{d}$. EQ. (2) enables comparing a predicted blocking pattern, $\overline{m}$, based on current candidate touches, $\overline{x}$ and $\overline{y}$, to an actual detected blocking pattern, $\overline{d}$, and measuring an error between the predicted blocking pattern and the actual detected blocking pattern.

There are different possibilities for an error metric, but calculating the norm of the difference in blocking patterns was found empirically to work well:

$$e = \Sigma_{k=1}^{N} |d_k - m_k|, \quad (3)$$

where $\overline{d}$ and $\overline{m}$ are the detected and modelled blocking vectors, respectively. In an ideal case the matching error, e, according to EQ. (3), would become zero for correct candidate touch combination, $\overline{x}$ and $\overline{y}$. In practice, though, the modeling and detection inaccuracies prevent this, and the calculated matching error, e, serves as a metric indicating whether one candidate touch combination is better than another. In the simplest form this can be used to test for potential ghost touch by calculating the matching error with and without that potential ghost touch location included in x and y. The most straight forward and robust approach is to calculate the matching error for all combinations of touch candidates and then pick the combination with lowest error as the right one.

Tracking

The matching error can be used as a metric to perform touch tracking, for moving touch locations. The method consists of three steps:

1. Update touch coordinates, $\bar{x}=(x_1, \ldots, x_n)$ and $\bar{y}=(y_1, \ldots, y_n)$, based on previous values and based on estimated speeds of motion, $\bar{v}=(v_1, \ldots, v_n)$ of the touch coordinates, to form a new set of candidate coordinates.
2. Perform an optimization on the touch coordinates, $\bar{x}$ and $\bar{y}$, to find the set which minimizes the matching error.
3. Update the touch coordinates, $\bar{x}$ and $\bar{y}$, and the speed estimates.

Figure 19:
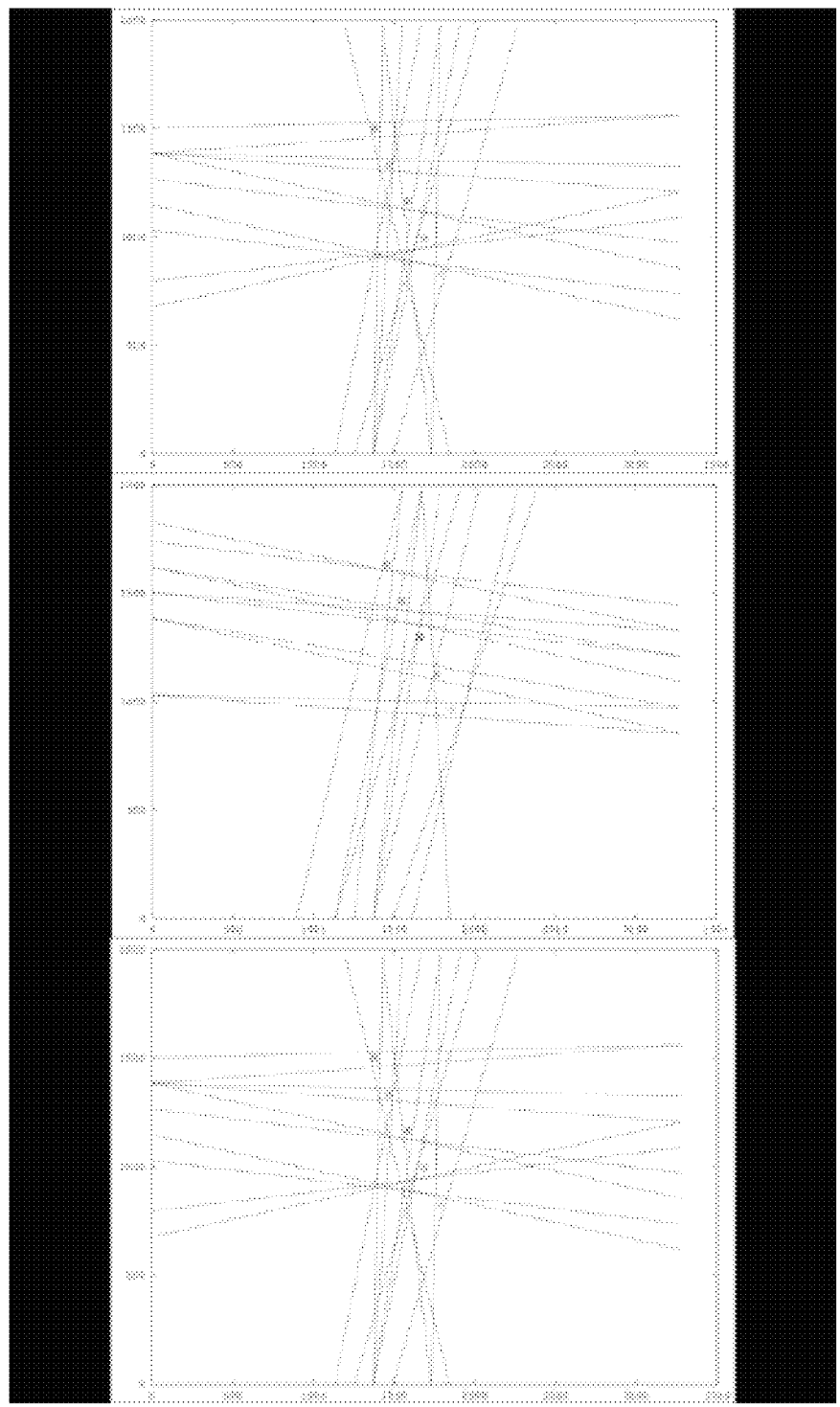
FIG. 19 is an illustration of a set of five touch coordinates being tracked, in accordance with an embodiment of the present invention.

Reference is made to FIG. 19, which is an illustration of a set of five moving touch coordinates being tracked with the above method, in accordance with an embodiment of the present invention. A circle in FIG. 19 denotes an actual coordinate, and a cross in FIG. 19 denotes the result of the above method. The number of light beams is pruned down to 100 from a total of about 300, by estimating from the model which beams are most likely to contribute to the matching error.

The optimization used in FIG. 19 is based on steepest descent. Other optimization algorithms, or a particular filter, may be used to perform the optimization step, and to find the best matching touch coordinates, Y and y.

Improving Touch Accuracy

Optimization of the matching error can alternatively be used to improve touch accuracy in situations where the detection algorithm does not perform well. This may happen close to edges or corners where there are fewer light beams available for coordinate calculation.

The optimization approach can be extended to cover inaccuracies due to finite beam acquisition time. In a multi-touch system based on tens of beams per touch, the acquisition may take long enough for the touches to move a significant distance. This can be taken into account by including estimated touch speeds, as additional unknowns, into the blocking pattern model $$\bar{m}=f(\bar{x},\bar{y},\bar{v}). \quad (4)$$

Each touch is assumed to be moving, and the sequence of measuring the beam data is included in the model for m.

This technique reduces the need for parallel beam acquisition, and consequently reduces total hardware cost of the multi-touch solution.

Touch Screen Assembly

According to embodiments of the present invention, a light guide for directing light beams for touch detection over and across the touch screen surface forms an exposed, outer frame of the screen. Embodiments of the invention are designed for desktop displays and All-in-One devices where there is little risk of trauma to the screen frame in the course of normal use, as compared to mobile phones, laptops and tablets. Nonetheless, the present invention is applicable to mobile phones, laptops and tablets as well.

Figure 20:
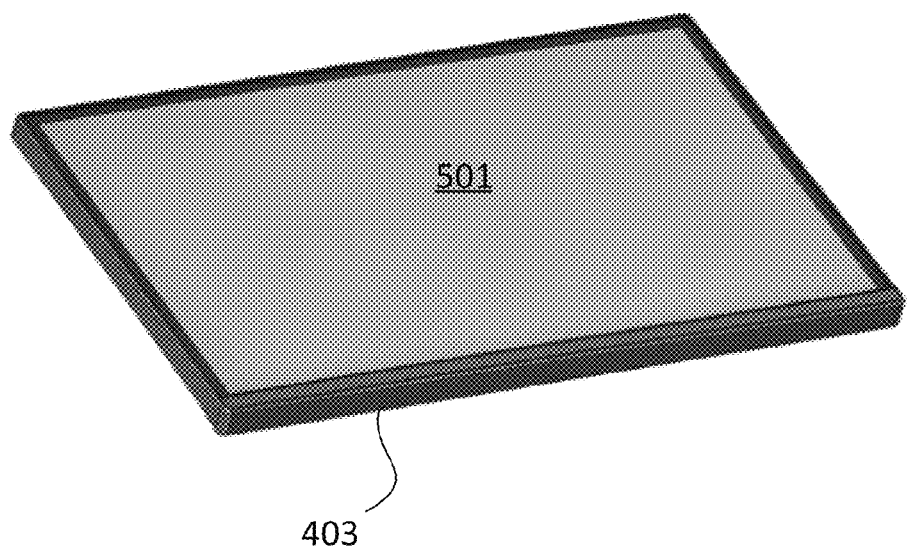
FIG. 20 is a simplified illustration of a touch screen display surrounded by an exposed light guide frame, in accordance with an embodiment of the present invention.

Reference is made to FIG. 20, which is a simplified illustration of a touch screen display surrounded by an exposed light guide frame, in accordance with an embodiment of the present invention. FIG. 20 shows a touch screen display monitor according to the teachings of the present invention, featuring a display 501 and an exposed surrounding frame 403 that serves as a light guide for directing near-infrared light beams from emitters located underneath the display out over the exposed surface of the display and back under the display to receivers. Light guide frame 403 has a very thin profile that extends upward along the outer edges of display 501. Preferably, display 501 has no stiffeners or structural support elements above its outer edges. This absence of metal overlays enables using the full upper surface of the display for rendering pixels, allowing the rendered image to span the full width and height of the display. The thin profile of light guide frame 403 makes this device very attractive. Furthermore, light guide frame 403 can be manufactured of transparent plastic that makes it seem as if the rendered image extends to the outer edges of the desktop or All-in-One display.

In other embodiments, visible light LEDs are provided to illuminate light guide frame 403. In one embodiment, the system identifies the color of the outermost pixels on the display and illuminates light guide frame 403 with a similar color so that the frame is adapted to visually blend into the rendered image.

Figure 21:
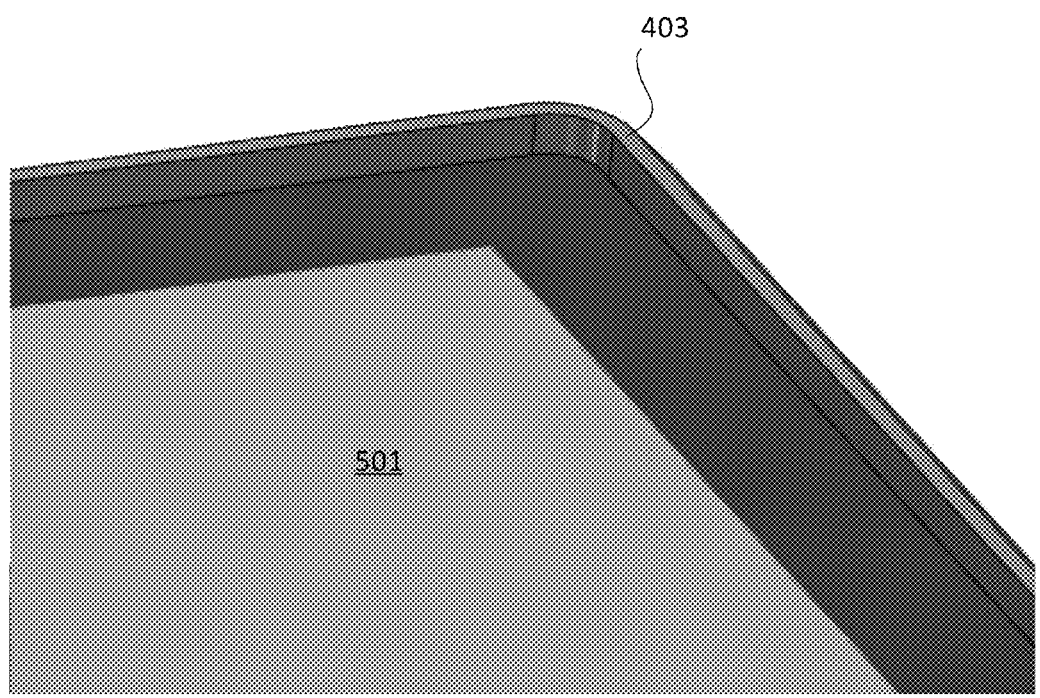
FIGS. 21 and 22 are magnified views of a corner of the touch screen of FIG. 20, in accordance with an embodiment of the present invention.
Figure 22:
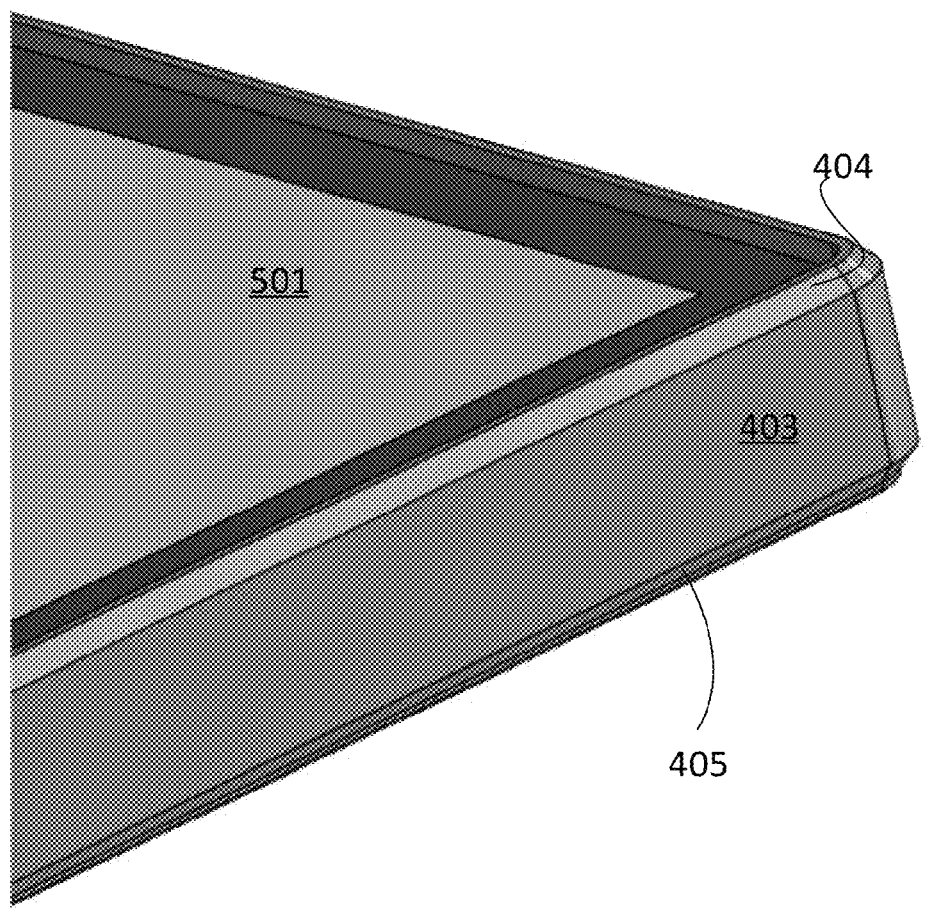

Reference is made to FIGS. 21 and 22, which are magnified views of a corner of the touch screen of FIG. 20, in accordance with an embodiment of the present invention. Frame 403 extends above display 501, but is very thin, so it adds very little to the width and length of the device. Frame 403 extends above display 501 in order to project and receive the near-infrared light beams above and across the screen surface.

FIG. 22 shows an enlarged view of one corner of the touch screen of FIG. 20, viewed from outside frame 403. Two internally reflective surfaces, 404 and 405, are shown for directing the near-infrared light beams from underneath display 501 across the screen surface.

Figure 23:
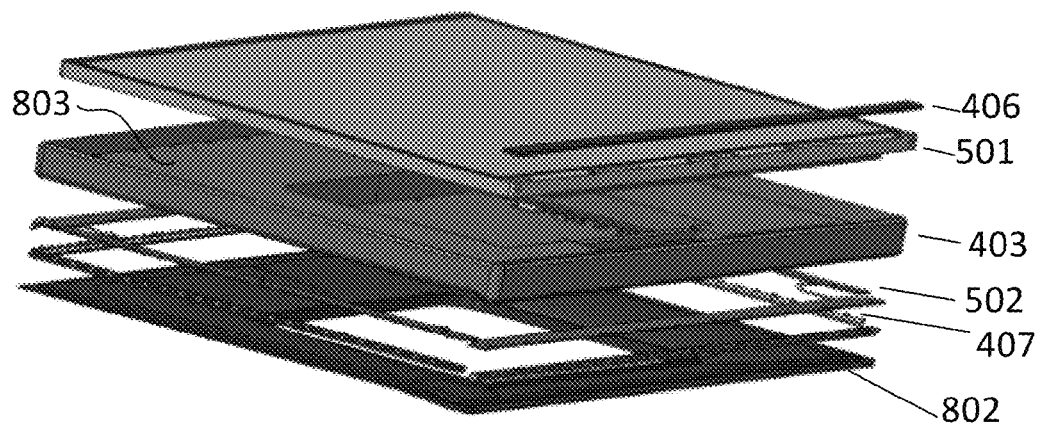
FIGS. 23 and 24 are exploded views of the touch screen of FIG. 20, in accordance with an embodiment of the present invention.
Figure 24:
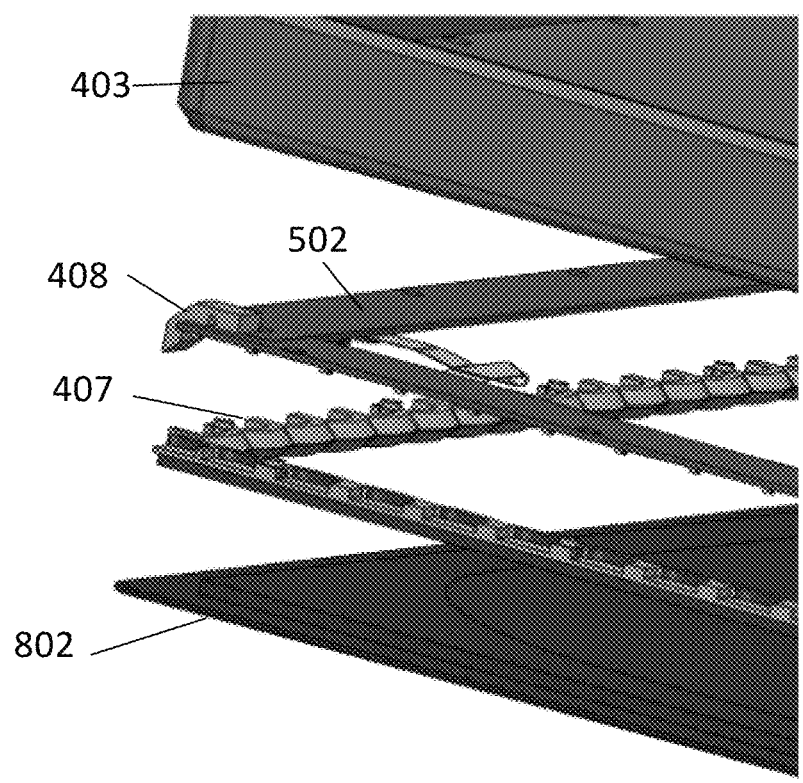

Reference is made FIGS. 23 and 24, which are exploded views of the touch screen of FIG. 20, in accordance with an embodiment of the present invention. As can be seen in FIG. 23, display 501 is inserted into frame 403 from above; from below, PCB 502 on which the near-infrared emitters and receivers are mounted is inserted into frame 403 as are lenses 407. Frame 403 is divided into an upper cavity and a lower cavity by floor 803. Display 501 is housed in the upper cavity, and PCB 502 and lenses 407 are housed in the lower cavity. In some embodiments, display 501 has some exposed electronics or mechanical stiffeners along one edge. The exposed electronics or mechanical stiffeners are covered by light guide 406 that transmits light exiting the upper edge of light guide 403 over the exposed electronics or mechanical stiffeners. In other embodiments, the display pixels extend to all four edges of display 501. In these other embodiments, light guide 406 is not used. The touch screen is supported and kept rigid by rear support 802.

FIG. 24 shows light guide frame 403, PCB 502, emitter and receiver lenses 407 and rear support 802. PCB 502 is formed by four PCB strips situated along the four edges of frame 403. Each PCB strip has a row of either emitters or receivers mounted on its underside, not shown in FIG. 24. At the corner, where two PCB strips meet, there is not sufficient room to mount both an emitter and a receiver, so one of these two elements, e.g., the emitter, is mounted on the topside of PCB 502 and coupled to lens 408 that redirects this element's light beam underneath PCB 502 so that this beam enters its respective lens 407.

Figure 25:
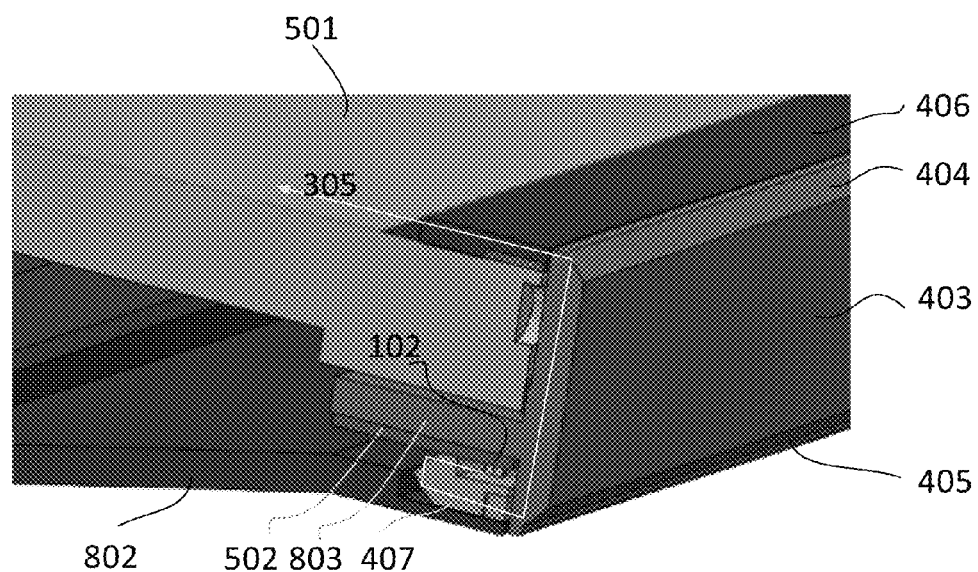
FIGS. 25-27 are cutaway views of the touch screen of FIG. 20, illustrating a light beam path from an emitter to crossing above the display to a receiver, in accordance with an embodiment of the present invention.
Figure 26:
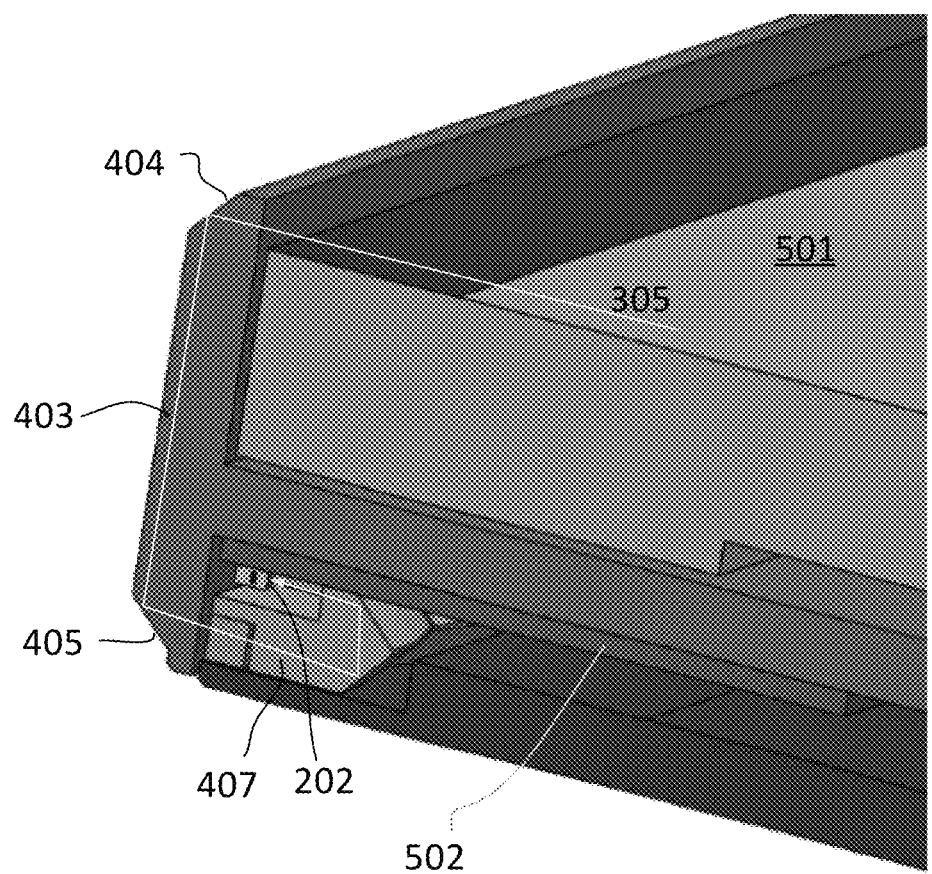
Figure 27:
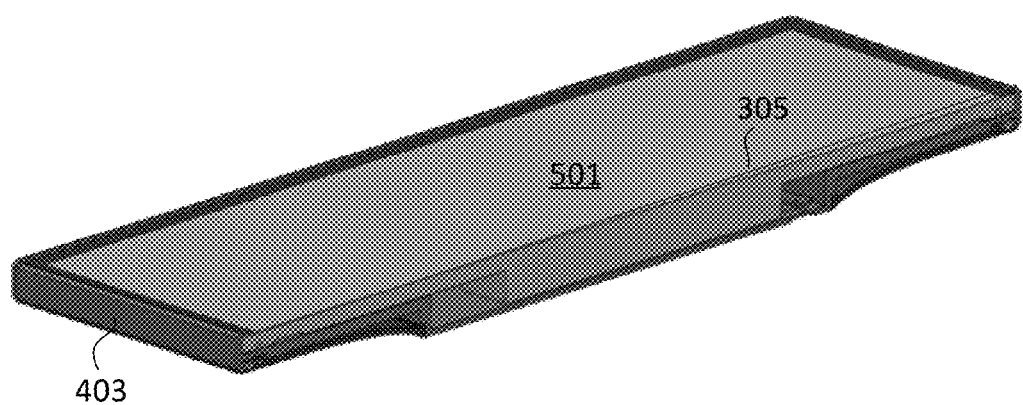

Reference is made to FIGS. 25-27, which are cutaway views of the touch screen of FIG. 20, illustrating a light beam path from an emitter crossing above the display to a receiver, in accordance with an embodiment of the present invention. FIG. 25 shows light guide frame 403, its upper and lower internally reflective surfaces 404 and 405 and floor 803. Display 501 is above floor 803 and PCB 502 is mounted on the underside of floor 803. A light emitter 102 is shown mounted on PCB 502. The path of light beam 305 is illustrated entering lens 407, being reflected by surfaces 405 and 404, through light guide 406, and out across the upper surface of screen 501.

FIG. 26 shows the path of light beam 305 toward receiver 202. As mentioned above, in the illustrated example light guide 406 is situated along only one edge of display 501. Thus, light guide 406 is present in FIG. 25 and absent in FIG. 26.

FIG. 27 shows the path of light beam 305 across the display, from an emitter to a receiver. As mentioned hereinabove, in the illustrated example light guide 406 is situated along only one edge of display 501 the light beam is wide and reaches multiple receivers. Thus, FIG. 27 is a simplified illustration of only the functionality of light guide frame 403.

Figure 28:
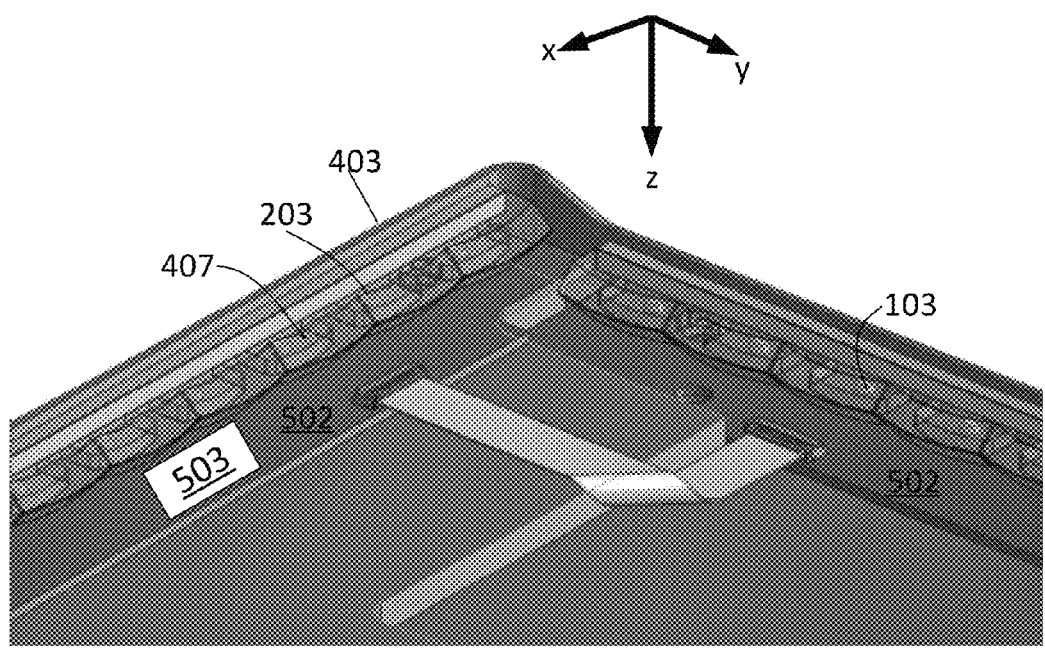
FIG. 28 is a magnified view of a corner of the touch screen of FIG. 20 viewed from below, with the screen's rear support removed, in accordance with an embodiment of the present invention.

Reference is made to FIG. 28, which is a magnified view of a corner of the touch screen of FIG. 20 viewed from below, with the screen's rear support removed, in accordance with an embodiment of the present invention. FIG. 28 shows the underside of light frame 403 in the touch screen of FIG. 20, and two PCBs 502, one on which emitters 103 are mounted and the other on which receivers 203 are mounted. Each emitter and receiver has a respective lens 407. Processor 503, shown mounted on PCB 502, is coupled with said LEDs 103 and PDs 203.

In some embodiments, light guide frame 403 is transparent, and furthermore, visible-light LEDs are mounted within frame 403, e.g., on PCB 502, to illuminate the frame, under certain conditions. In some embodiments, the frame is illuminated to notify the user, e.g., upon receiving an email or a video call the frame is illuminated a specific color.

Furthermore, the infrared light used for touch detection is transmitted through frame 403 by total internal reflection (TIR). As such, when an object having a higher index of refraction than the frame touches the frame, the object absorbs a portion of the transmitted infrared light. This absorption is detected as a reduction in expected light at the receivers. Significantly, this reduction occurs only to light beams along one axis, not both axes, when a user touches one edge of the frame. Thus, a touch on the frame is distinguished from a touch on the screen which causes detections on two axes. This touch gesture, namely, a touch or tap on the outside of frame 403, is used in some embodiments to activate a function, e.g., to open the Charms bar in certain Windows operating systems. WINDOWS® is a registered trademark of Microsoft Corporation. In other embodiments, when a notification of an incoming email or video call is received, this gesture opens the email or the video call. In another embodiment, a tap on the frame wakes up the computer from sleep mode. This can be communicated to the user by illuminating the frame in response to the tap.

Still further, a swipe gesture along an outer edge of frame 403 is also detectable because as the user glides his finger along the edge his finger absorbs infrared light beams from different emitters or receivers. Therefore, swipe gestures are also enabled on the outer perimeter of the frame.

Figure 31:
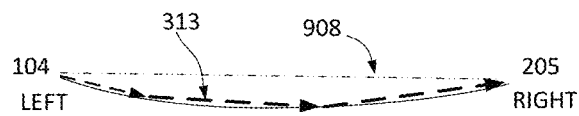
FIG. 31 is a side view of the touch screen display of FIG. 29, in accordance with an embodiment of the present invention.
Figure 31:
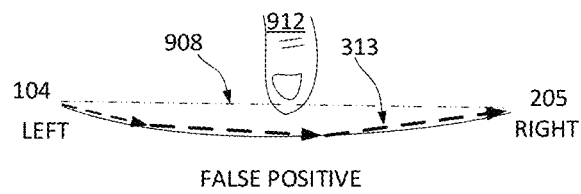
Figure 31:
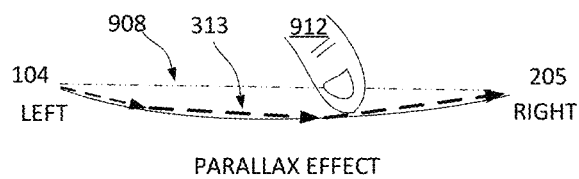
Figure 31:
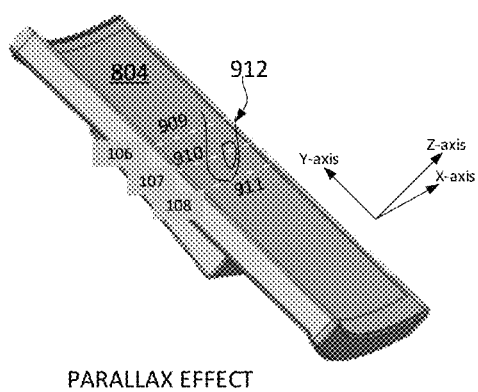

An advantage of the touch screen assembly described above is the ability to accommodate light-based touch sensitivity for curved display screens. A technical challenge arises when trying to emit light from one edge of a curved screen to an opposite edge. In general, it is not possible for light to travel from one edge of the screen to the opposite edge along a single plane, since the edges are not co-planar. Furthermore, even if two opposite edges are coplanar, use of a single plane to direct light over a curved screen leads to touch detection errors due to the screen dipping underneath the plane, as shown in FIG. 31 below. Moreover, the frame that guides the emitted light is generally only able to guide the light at a fixed orientation relative to the screen surface. In order to overcome this technical challenge, special light paths that follow the contour of the curved screen and bounce light reflectively off of the screen surface are used. Specifically, the frame is oriented so as to guide the light emitted by the LEDs along light paths that travel across the screen in segments that follow the contour of the display screen, which are incident upon and reflect off of the display screen one or more times, while crossing the screen.

Figure 29:
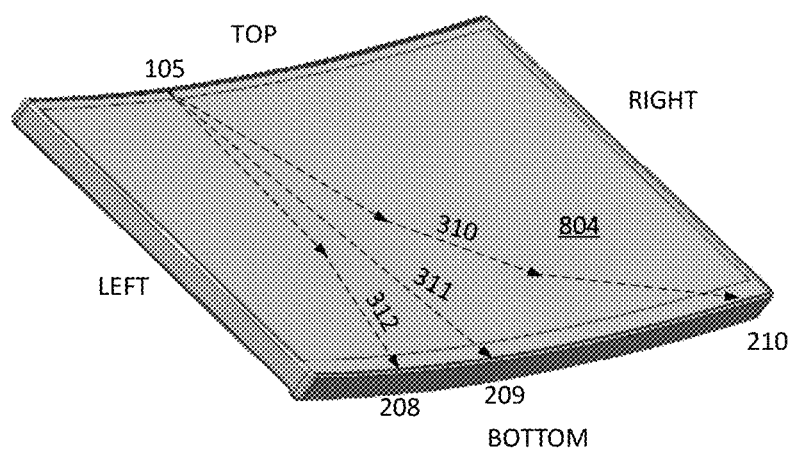
FIG. 29 is a front view of a touch screen display for an all-in-one computer, showing light paths from top to bottom in accordance with an embodiment of the present invention.

Reference is made to FIG. 29, which is a front view of a touch screen display 804 for an all-in-one computer, showing light paths 310-312 from top to bottom in accordance with an embodiment of the present invention. The screen surface of FIG. 29 has a curved cross-section in the left-to-right direction and a straight cross-section in the top-to-bottom direction. In one embodiment of the present invention, the screen has a 34" diagonal.

As shown in FIG. 29, emitted light travels from the top edge of the screen along light paths that may have one or more reflections off of the screen surface until they reach the bottom edge. Specifically, the light emitted from the top edge is directed parallel to the screen surface. The light oriented parallel to the top-to-bottom dimension reaches the opposite edge in a straight line. However, the light that is skewed towards the left or right edges encounters one or more reflections off of the screen surface, depending on the amount of the skew, due to the curvature of the surface in the left-to-right direction. FIG. 29 shows three top-to-bottom light paths; namely, a center light path 311 with no reflections, a light path 312 skewed leftward with one reflection, and a light path 310 skewed rightward with two reflections. FIG. 29 shows emitter location 105 and receiver locations 208-210.

Figure 30:
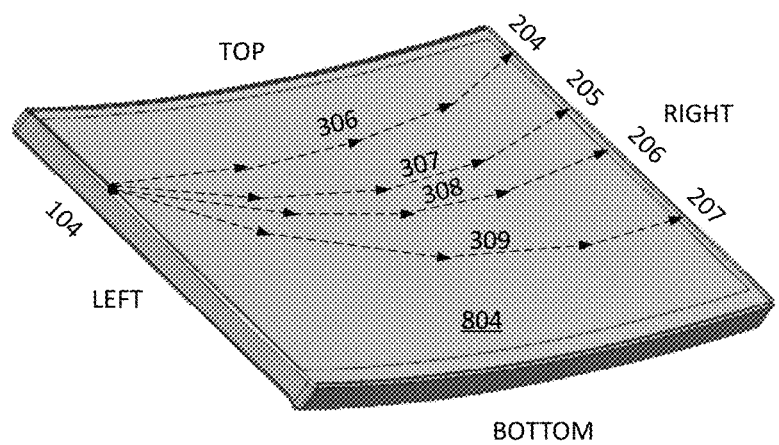
FIG. 30 is a front view of the touch screen display of FIG. 29, showing light paths from left to right in accordance with an embodiment of the present invention.

Reference is made to FIG. 30, which is a front view of touch screen display 804 of FIG. 29, showing light paths 306-309 from left to right in accordance with an embodiment of the present invention. The light paths shown in FIG. 30 reflect multiple times off of the screen surface, following the contour of the surface, and eventually make their way to the right edge. FIG. 30 shows emitter location 104 and receiver locations 204-207.

Although the left-to-right light paths could have been generated as straight lines, since the left and right edges are co-planar in the screen of FIG. 30, use of such light paths would, however, lead to touch detection errors, as explained in what follows.

Reference is made to FIG. 31, which is a side view of the touch screen display of FIG. 29, in accordance with an embodiment of the present invention. FIG. 31 shows imaginary straight line paths 908-911 and an imaginary finger 912 blocking the paths. FIG. 31 also shows emitter location 104 and receiver location 205. FIG. 31 also shows light path 313 which follows the contour of the curved screen surface, and emitter locations 106-108 at the left edge of imaginary straight line paths 909-911, respectively. Were these straight line light paths to be used instead of the light paths of FIG. 30, which follow the contour of the curved screen surface, then two types of touch detection errors would arise. A first error, designated "false positive" in FIG. 31, arises when a finger blocks the straight line path while not touching the screen. Were straight line light paths to be used, a touch would be detected when in fact the finger does not touch the screen. A second error, referred to as "parallax effect", arises when the finger is slanted non-orthogonal to the screen surface, skewed towards the top or towards the bottom of the surface. Were straight line light paths to be used, a touch would be detected at a location on the screen below the middle of the finger instead of at the bottom of the finger. As such, it may be appreciated that use of the light paths of FIG. 30, which follow the contour of the curved screen, reflecting off of the screen, avoids both of these types of errors.

Figure 32:
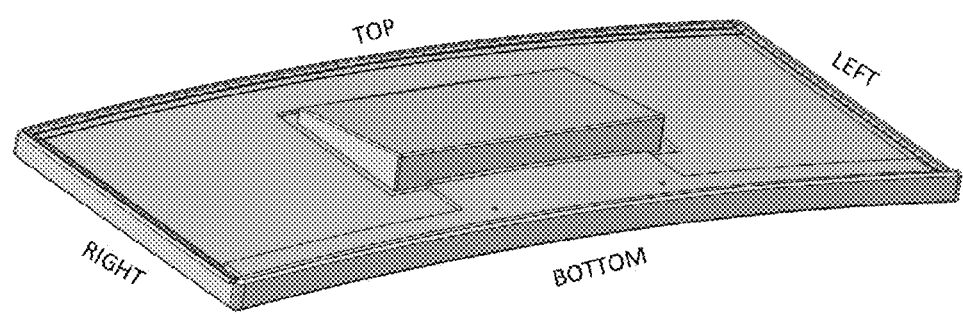
FIG. 32 is a back view of the touch screen display of FIG. 29, in accordance with an embodiment of the present invention

Reference is made to FIG. 32, which is a back view of the touch screen display of FIG. 29, in accordance with an embodiment of the present invention.

Figure 33:
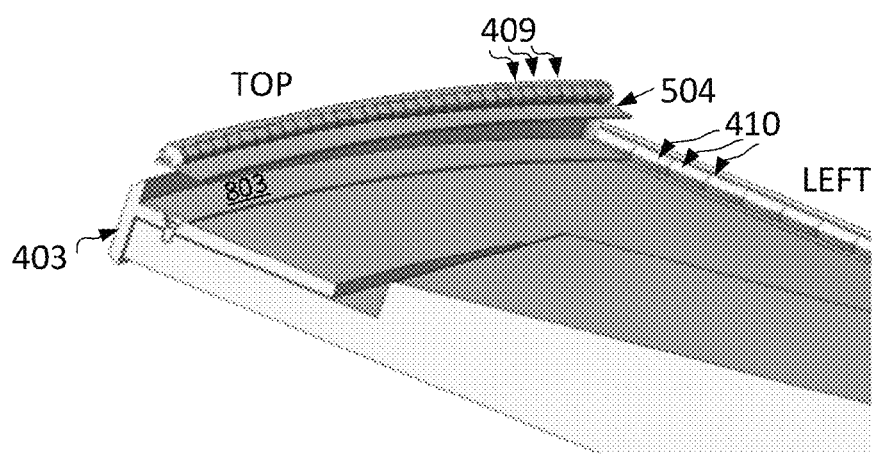
FIG. 33 is an exploded cutaway back view of the touch screen display of FIG. 29 and a PCB strip for LEDs underneath the display, in accordance with an embodiment of the present invention.

Reference is made to FIG. 33, which is an exploded cutaway back view of the touch screen display of FIG. 29 and a PCB strip 504 for LEDs underneath the display, in accordance with an embodiment of the present invention. Also shown in FIG. 33 are lenses 409 for the LEDs that guide light from the LEDs into light guide frame 403, floor 803 and LED lenses 410 along the left edge of the screen.

Figure 34:
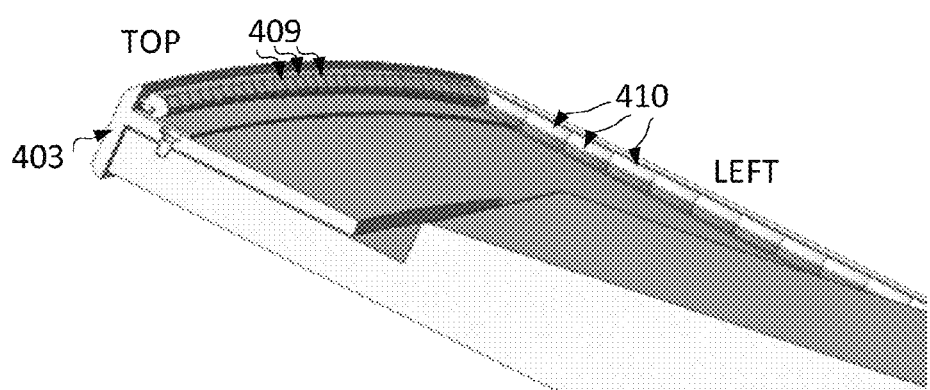
FIG. 34 is an assembled view corresponding to the exploded view of FIG. 33, in accordance with an embodiment of the present invention.

Reference is made to FIG. 34, which is an assembled view corresponding to the exploded view of FIG. 33, in accordance with an embodiment of the present invention.

In the foregoing specification, the invention has been described with reference to specific exemplary embodiments thereof. It will, however, be evident that various modifications and changes may be made to the specific exemplary embodiments without departing from the broader spirit and scope of the invention. Accordingly, the specification and drawings are to be regarded in an illustrative rather than a restrictive sense.

The invention claimed is:

1. A touch screen assembly, comprising:
   a curved display screen;
   a plurality of light emitters, mounted underneath said display screen, operative to emit light when activated;
   a plurality of photo diodes, mounted underneath said display screen, operative to detect amounts of light received when activated;
   a frame comprising internally reflective surfaces that guide light emitted by said light emitters along light paths that travel upwards, above and across said display screen in segments that follow the contour of said display screen, and downwards to said photo diodes, wherein the frame is oriented such that some of the light paths are incident upon and reflect off of said display screen while crossing said display screen; and
   a processor coupled with said light emitters and said photo diodes, operative to selectively activate said light emitters and said photo diodes, and to identify a location of an object touching said display screen, based on amounts of light detected by activated photo diodes when light emitted by activated light emitters is blocked by the object along its light path.

2. The touch screen assembly of claim 1 wherein said curved display screen has a curved contour cross-section in one direction and a straight contour cross-section in another direction.

3. The touch screen assembly of claim 1 wherein said curved display screen is approximately 34" from corner-to-corner diagonally.

4. The touch screen assembly of claim 1 wherein said frame further comprises:
   an exposed upper edge along the entire frame perimeter; and
   vertically straight inner walls, extending from below said display screen to said exposed upper edge of the frame, along the entire frame perimeter.

5. The touch screen assembly of claim 1 whereby said display screen has neither stiffeners nor support elements at its upper surface.

6. The touch screen assembly of claim 1 further comprising:
   a floor dividing said frame into an upper cavity that houses said display screen, and a lower cavity; and
   PCB strips, housed in the lower cavity, on which said light emitters and said photo diodes are mounted.

7. The touch screen assembly of claim 1 wherein said processor recognizes the object touching outer walls of said frame based on amounts of light detected by activated photo diodes when light emitted by activated light emitters is absorbed along its light path by the object at the outer walls, thereby providing light-based touch sensitivity to said frame.

8. The touch screen assembly of claim 7 further comprising visible-light LEDs mounted underneath said frame, which are illuminated by said processor in response to recognizing the object touching the outer walls of said frame.

9. The touch screen assembly of claim 7 wherein said processor opens a user interface bar in response to recognizing the object touching the outer walls of said frame.

10. The touch screen assembly of claim 1 further comprising visible-light LEDs mounted underneath said frame, which are illuminated by said processor to match the illumination of said display screen at its outer edges, thereby giving an appearance that the image displayed on said display screen extends to said frame.

11. The touch screen assembly of claim 1 further comprising:
   a network adaptor connected to said processor; and
   visible-light LEDs mounted underneath said frame,
wherein said processor illuminates said visible-light LEDs in response to said network adaptor receiving a communication.

* * * * *